(12) United States Patent
Li et al.

(10) Patent No.: US 11,929,504 B2
(45) Date of Patent: *Mar. 12, 2024

(54) COATED VERTICALLY ALIGNED CARBON NANOTUBES ON NICKEL FOAM

(71) Applicants: Wenzhi Li, Miami, FL (US); Arun Thapa, Miami, FL (US)

(72) Inventors: Wenzhi Li, Miami, FL (US); Arun Thapa, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/938,832

(22) Filed: Oct. 7, 2022

(65) Prior Publication Data

US 2023/0085275 A1 Mar. 16, 2023

Related U.S. Application Data

(63) Continuation of application No. 17/471,313, filed on Sep. 10, 2021, now Pat. No. 11,476,464.

(51) Int. Cl.
| | |
|---|---|
| H01M 4/583 | (2010.01) |
| H01M 4/04 | (2006.01) |
| H01M 4/36 | (2006.01) |
| H01M 4/38 | (2006.01) |
| H01M 4/48 | (2010.01) |

(Continued)

(52) U.S. Cl.
CPC ......... *H01M 4/583* (2013.01); *H01M 4/0428* (2013.01); *H01M 4/366* (2013.01); *H01M 4/38* (2013.01); *H01M 4/48* (2013.01); *H01M 10/0525* (2013.01); *H01M 2004/021* (2013.01)

(58) Field of Classification Search
None
See application file for complete search history.

(56) References Cited

U.S. PATENT DOCUMENTS

| | | | |
|---|---|---|---|
| 9,819,016 B1 * | 11/2017 | Forohar | ............... H01M 4/366 |
| 10,336,618 B1 | 7/2019 | Li | |
| 10,961,123 B2 | 3/2021 | Li | |

(Continued)

FOREIGN PATENT DOCUMENTS

| | | | |
|---|---|---|---|
| CN | 101661840 B | * | 2/2011 |
| CN | 104036878 | | 9/2014 |

(Continued)

OTHER PUBLICATIONS

Ren et al., Applied Physics Letters, 1999, 75, 1086-1088. (Year: 1999).*

(Continued)

*Primary Examiner* — Zhongqing Wei
(74) *Attorney, Agent, or Firm* — Saliwanchik, Lloyd & Eisenschenk

(57) ABSTRACT

Vertically aligned carbon nanotubes (VACNTs) (e.g., multi-walled VACNTs and methods of synthesizing the same are provided. VACNTs can be synthesized on nickel foam (Ni—F), for example by using a plasma-enhanced chemical vapor deposition (PECVD) technique. A wet chemical method can then be used to coat on the VACNTs a layer of nanoparticles, such as tin oxide ($SnO_2$) nanoparticles.

20 Claims, 9 Drawing Sheets

(51) Int. Cl.
H01M 10/0525 (2010.01)
H01M 4/02 (2006.01)

(56) References Cited

U.S. PATENT DOCUMENTS

| | | | |
|---|---|---|---|
| 10,968,103 B1 | 4/2021 | Li et al. | |
| 2003/0203139 A1 | 10/2003 | Ren | |
| 2004/0255652 A1* | 12/2004 | Lee | B82Y 30/00 |
| | | | 73/105 |
| 2006/0057388 A1 | 3/2006 | Jin | |
| 2006/0177602 A1 | 8/2006 | Dijon | |
| 2008/0191606 A1* | 8/2008 | Geohegan | C08J 5/005 |
| | | | 313/501 |
| 2009/0114883 A1 | 5/2009 | Collier | |
| 2013/0075386 A1 | 3/2013 | Chang | |
| 2014/0126112 A1 | 5/2014 | Nguyen et al. | |
| 2014/0313636 A1 | 10/2014 | Tour | |
| 2015/0240351 A1 | 8/2015 | Chen | |

FOREIGN PATENT DOCUMENTS

| | | |
|---|---|---|
| CN | 105338799 | 2/2016 |
| CN | 107119262 | 9/2017 |
| EP | 0665187 | 8/1998 |
| JP | 2005-001938 | 1/2001 |
| TW | 444067 | 7/2001 |

OTHER PUBLICATIONS

Gaohui Du et al., Filling Carbon Nanotubes with Co9S8 Nanowires through in Situ Catalyst Transition and Extrusion, J. Phys. Chem. C 2008, 112, 1890-1895.

Qingmei Su et al., In Situ Transmission Electron Microscopy Investigation of the Electrochemical Lithiation—Delithiation of Individual Co9S8/Co-Filled Carbon Nanotubes, www.acsnano.org, vol. 7, No. 12, 2013, 11379-11387.

R. Kozhuharova et al., Synthesis and characterization of aligned Fe-filled carbon nanotubes on silicon substrates, Journal of Materials Science: Materials in Electronics 14 (2003) 789-791.

Qingmei Su et al., In Situ Synthesis of Iron/Nickel Sulfide Nanostructures-Filled Carbon Nanotubes and Their Electromagnetic and Microwave-Absorbing Properties, The Journal of Physical Chemistry, 2011, 115, 1838-1842.

Wang-Jing Yu et al., Synthesis and Electrochemical Lithium Storage Behavior of Carbon Nanotubes Filled with Iron Sulfide Nanoparticles, Advanced Science, 2016, 3, 1600113.

Shuoyu Li et al., Self-Climbed Amorphous Carbon Nanotubes Filled with Transition Metal Oxide Nanoparticles for Large Rate and Long Lifespan Anode Materials in Lithium Ion Batteries, American Chemical Society, ACS Appl. Mater. Interfaces 2017, 9, 26818-26825.

Jinqing Hu et al., Carbon Nanotubes as Nanoreactors for Fabrication of Single-Crystalline Mg3N2 Nanowires, Nano Letters, 2006 vol. 6, No. 6, 1136-1140.

Wan-Jing Yu et al., Lithiation of Silicon Nanoparticles Confined in Carbon Nanotubes, ACS Nano, vol. 9, No. 5, 2015, 5063-5071.

M. Monthioux et al., Hybrid carbon nanotubes: Strategy, progress, and perspectives, J. Mater. Res., vol. 21, No. 11, Nov. 2006.

Yuba Raj Poudel et al., Synthesis, properties, and applications of carbon nanotubes filled with foreign materials: a review, Materials Today Physics 7 (2018) 7-34.

X. Song et al., Morphology-dependent performance of nanostructured Ni3S2/Ni anode electrodes for high performance sodium ion batteries, Nano Energy 26 (2016) 533-540.

Wan-Jing Yu et al., High Reversible Lithium Storage Capacity and Structural Changes of Fe 2 O 3 Nanoparticles Confi ned inside Carbon Nanotubes, Advanced Energy Materials, 2016, 6, 1501755, 10 pages.

Wan-Jing Yu et al., Synthesis and Electrochemical Lithium Storage Behavior of Carbon Nanotubes Filled with Iron Sulfide Nanoparticles, Advanced Science, 2016, 1600113, 8 pages.

Lei Xu et al., Confined Synthesis of FeS2 Nanoparticles Encapsulated in Carbon Nanotube Hybrids for Ultrastable ithium-Ion Batteries, ACS Sustainable Chem. Eng. 2016, 4, 4251-4255.

Lucas Moller et al., CoFe2O4-filled carbon nanotubes as anode material for lithium-ion batteries, Journal of Alloys and Compounds 834 (2020) 155018, 6 pages.

Qingmei Su et al., In Situ Transmission Electron Microscopy Observation of Electrochemical Sodiation of Individual Co9S8-Filled Carbon Nanotubes, ACS Nano, vol. 8, N. 4, 2014, 3620-3627.

Jinliang Zhu et al., One-step synthesis of Ni3S2 nanoparticles wrapped with in situ generated nitrogen-self-doped graphene sheets with highly improvedelectrochemical properties in Li-ion batteries, J. Mater.Chem. A., The Royal Society of Chemistry 2014, 2, 3142-3147.

Xianggang Guan et al., Carbon Wrapped Ni3S2 Nanocrystals Anchored on Graphene Sheets as Anode Materials for Lithium-Ion Battery and the Study on Their Capacity Evolution, Nanomaterials 2018, 8, 760, 14 pages.

Jia-Lin Xu et al., Ni-doped Ni3S2 nanoflake intertexture grown on graphene oxide as sheet-like anode for high-performance lithium-ion batteries, Journa of Alloys and Compounds 835 (202) 155418, 8 pages.

Ruili Zhang et al., Ni3S2@Graphene oxide nanosheet arrays grown on NF as binder-free anodes for lithium ion batteries, Journal of Alloys and Compounds 810 (2019) 151861, 7 pages.

Zhujun Yao et al., Enhanced Li-Storage of Ni3S2 Nanowire Arrays with N-Doped Carbon Coating Synthesized by One-Step CVD Process and Investigated Via Ex Situ TEM, Small 2019, 15, 1904433, 7 pages.

Philip G. Collins et al., Current Saturation and Electrical Breakdown in Multiwalled Carbon Nanotubes, Physical Review Letters, vol. 86, No. 14, Apr. 2, 201, 4 pages.

Ren et al., Synthesis of Large Arrays of Well-Aligned Carbon Nanotubes on Glass, Science, 1998, pp. 1105-1107, vol. 282, No. 5391.

Lin et al., Field emission properties of aligned carbon nanotubes grown on stainless steel using CH4/CO2 reactant gas, Diamond and Related Materials, 2004, pp. 1026-1031, vol. 13, Issues 4-8.

Neupane et al., Synthesis and electron field emission of vertically aligned carbon nanotubes grown on stainless steel substrate, 26th International Vacuum Nanoelectronics Conference (IVNC), 2013, pp. 1-2.

Song et al., Field emission from carbon nanotube arrays fabricated by pyrolysis of iron phthalocyanine, Journal of Physics D: Applied Physics, 2003, pp. 5-9, vol. 37.

Melechko et al., Vertically aligned carbon nanofibers and related structures: Controlled synthesis and directed assembly, Journal of Applied Physics, 2005, pp. 04130 (pp. 1-39), vol. 97, No. 4.

Neupane et al., Synthesis and field emission properties of vertically aligned carbon nanotube arrays on copper, Carbon, 2012, pp. 2641-2650, vol. 50, No. 7.

Prasek et al., Methods for carbon nanotubes synthesis-review, Journal of Materials Chemistry, 2011, pp. 15872-15884, vol. 21, No. 40.

Hofmann et al., Low-temperature growth of carbon nanotubes by plasma-enhanced chemical vapor deposition, Applied Physics Letters, 2003, pp. 135-137, vol. 83, No. 1.

Ren et al., Growth of a single freestanding multiwall carbon nanotube on each nanonickel dot, Applied Physics Letters, 1999, pp. 1086-1088, vol. 75, No. 8.

Katsounaros et al., Microwave characterization of vertically aligned multiwalled carbon nanotube arrays, Applied Physics Letters, 2011, pp. 203105 (pp. 1-3), vol. 98, No. 20.

Wang et al., Nucleation and growth of well-aligned, uniform-sized carbon nanotubes by microwave plasma chemical vapor deposition, Applied Physics Letters, 2001, pp. 4028-4030, vol. 78, No. 25.

Sano, et al., A simple oxidation-reduction process for the activation of a stainless steel surface to synthesize multi-walled carbon nanotubes and its application to phenol degradation in water, Carbon, 2012, pp. 115-122, vol. 50, No. 1.

(56) References Cited

OTHER PUBLICATIONS

Hashempour et al., Effects of CVD direct growth of carbon nanotubes and nanofibers on microstructure and electrochemical corrosion behavior of 316 stainless steel, Materials Characterization, 2014, pp. 64-76, vol. 92.
Sano et al., Fabrication of carbon nanotube film directly grown on conductive stainless steel film and application to dielectrophoretic nanoparticle capture, Journal of Applied Physics, 2014, pp. 154302 (pp. 1-6), vol. 115, No. 15.
Pattinson, et al., Mechanism and Enhanced Yield of Carbon Nanotube Growth on Stainless Steel by Oxygen-Induced Surface Reconstruction, Chemistry of Materials, 2015, pp. 932-937, vol. 27, No. 3.
Hashempour et al., Direct growth of MWCNTs on 316 stainless steel by chemical vapor deposition: Effect of surface nano-features on CNT growth and structure, Carbon, 2013, pp. 330-347, vol. 63.
Baddour et al., A simple thermal CVD method for carbon nanotube synthesis on stainless steel 304 without the addition of an external catalyst, Carbon, 2008, pp. 313-318, vol. 47, No. 1.
Park et al., Pretreatment of stainless steel substrate surface for the growth of carbon nanotubes by PECVD, Journal of Materials Science, 2003, pp. 4933-4939, vol. 38.
Park et al., Synthesis of carbon nanotubes on metallic substrates by a sequential combination of PECVD and thermal CVD, Carbon, 2003, pp. 1025-1029, vol. 41, No. 5.
Abad et al., Catalytic growth of carbon nanotubes on stainless steel: Characterization and frictional properties, Diamond and Related Materials, 2008, pp. 1853-1857, vol. 17, No. 11.
Masarapu et al., Direct Growth of Aligned Multiwalled Carbon Nanotubes on Treated Stainless Steel Substrates, Langmuir, 2007, pp. 9046-9049, vol. 23, No. 17.
Chhowalla et al., Growth process conditions of vertically aligned carbon nanotubes using plasma enhanced chemical vapor deposition, Journal of Applied Physics, 2001, pp. 5308-5317, vol. 90, No. 10.
Bower et al., Nucleation and growth of carbon nanotubes by microwave plasma chemical vapor deposition, Applied Physics Letters, 2000, pp. 2767-2769, vol. 77, No. 17.
Neupane, Synthesis and enhanced electron field emission of vertically aligned carbon nanotubes grown on stainless steel substrate, Journal of Nanoscience Letters, 2014, pp. 1-7.
Sinha et al., Field Emission Properties of Carbon Nanotube Thin Films Grown on Different Substrate Materials, 8th IEEE Conference on Nanotechnology, 2008, pp. 270-273.
Thapa et al., Direct growth of vertically aligned carbon nanotubes on stainless steel by plasma enhanced chemical vapor deposition, Diamond & Related Materials 90 (2018) 144-153.
Thapa et al., Improving field emission properties of vertically aligned carbon nanotube arrays through a structure modification, Electronic materials, J Mater Sci (2020) 55:2101-2117.
A. A. Setlur et al., Formation of Filled Carbon Nanotubes and Nanoparticles Using Polycyclic Aromatic Hydrocarbon Molecules, Carbon vol. 36, No. 5-6, pp. 721-723, 1998.
C. Y. Zhang et al., Cu-filled cabon nanotubes by simultaneous plasma-assisted copper incorporation, Appl. Phys. Lett. 82 1926 (2003); https://doi.org/10.1063/1.1562341.
X. Y. Tao et al., Thermal CVD synthesis of carbon nanotubes filled with single-crystalline Cu nanoneedles at tips, Diamond and Related Materials, 15 (2006) 1271-1275.
X. Y. Tao et al., Controllable synthesis of novel one-dimensional carbon nanomaterials on an alkali-element-modified Cu catalyst, Nanotechnology 17 (2006) 224-226.
Zhiyu Wang et al., In situ synthesis of super-long Cu nanowires inside carbon nanotubes with coal as carbon source, Carbon 44 (2006 1845-1869.
Bin Deng et al., Synthesis of Copper-Core/Carbon-Sheath Nanocables by a Surfactant-Assisted Hydrothermal Reduction/Carbonization Process, J. Phys. Chem. B 2006, 110, 11711-11716.
X. Y. Tao et al., Synthesis and characterization of Cu filled carbon nanohorns, Materials Chemistry and Physics, 104 (2007) 210-214.
Q. Zhang et al., Synthesis of carbon nanotubes with totally hollow channels and/or with totally copper filled nanowires, Applied Physics A 86, 265-269 (2007).
Jijun Ding et al., One-step synthesis of pure Cu nanowire/carbon nanotube coaxial nanocables with different structures by arc discharge, Journal of Physics and Chemistry of Solids 72 (2011) 1519-1523.
Yuxin Zhao et al., A flexible chemical vapor deposition method to synthesize copper@carbon core-shell structured nanowires and the study of their structural electrical properties, New J. Chem., 2012, 36, 1161-1169.
Zhu, Synthesis of bamboo-like carbon nanotubes on a copper foil by catalytic chemical vapor deposition from ethanol, 2012, Carbon 50, pp. 2504-2512, 2012.
Katar, Direct Deposition of Bamboo-Like Carbon Nanotubes on Copper Substrates by Sulfur-Assisted HFCVD, 2008, Hindawi Publishing Corporation, Journal of Nanomaterials, vol. 2008, article ID 515890, 7 pages, 2008.
Ren et al., Nanocrystalline tin oxide electrodeposited on carbon nanotube for high performance electrochemical capacitive energy storage, Mater. Res. Express 6 (2019) 065022, 7 pages.
Wu et al., Outstanding field emission properties of titanium dioxide /carbon nanotube composite cathodes on 3D nickel foam, Journal of Alloys and Compound 726 (2017) 675-679.
Xu et al., Electron field emission from screen-printed graphene/ DWCNT composite films, Journal of Alloys and Compounds 551 (2013) 348-351.
Xu et al., Outstanding field emission properties of wet-processed titanium dioxide coated carbon nanotube based field emission devices, Applied Physics Letters 106, 073501 (2015), 6 pages.
Zhang et al., One-Pot Synthesis of SnO2/CNT Composite Anode Combined with Nickel Foam as a Current Collector for Lithium Ion Batteries, Asian Journal of Chemistry; vol. 24, No. 10 (2012), 4290-4294.
Zhan, Preparation of Ultra-smooth Cu Surface for High-Quality Graphene Synthesis, 2018, Nanoscale Research Letters 13:340, Springer Open (distributed under the terms of the Creative Commons Attribution 4.0 International License (http://creativecommons.org/licenses/by/4.0/, no changes made). (Year: 2018).
Prochazka, Ultrasmooth metallic foils for growth of high quality graphene by chemical vapor deposition, 2014, Nanotechnology 25, IOP Publishing, 185601 (8pp). (Year: 2014).
Griep, Enhanced Graphene Mechanical Properties through Ultrasmooth Copper Growth Substrates, 2016, Nano Letters 16, pp. 1657-1662 (year: 2016).
Noerochim et al., Free-standing single-walled carbon nanotube/ SnO2 anode paper for flexible lithium-ion batteries, Carbon 50 (2012) 1289-1297.
Zhang et al., Ultrafine Amorphous SnOx Embedded in Carbon Nanofiber/Carbon Nanotube Composites for Li-Ion and Na-Ion Batteries, Advanced Functional Materials, 2015, 25, 5222-5228.
Ma et al., Carbon coated SnO2 nanoparticles anchored on CNT as a superior anode material for lithium-ion batteries, Nanoscale, 8(7) (2016) 4121.
Thapa et al., J. Mater. Sci., 2020, 55, 2101-2117 (Year: 2020).
Wang et al., Journal of Power Sources, 2008, 184, 432-436 (Year: 2008).

* cited by examiner

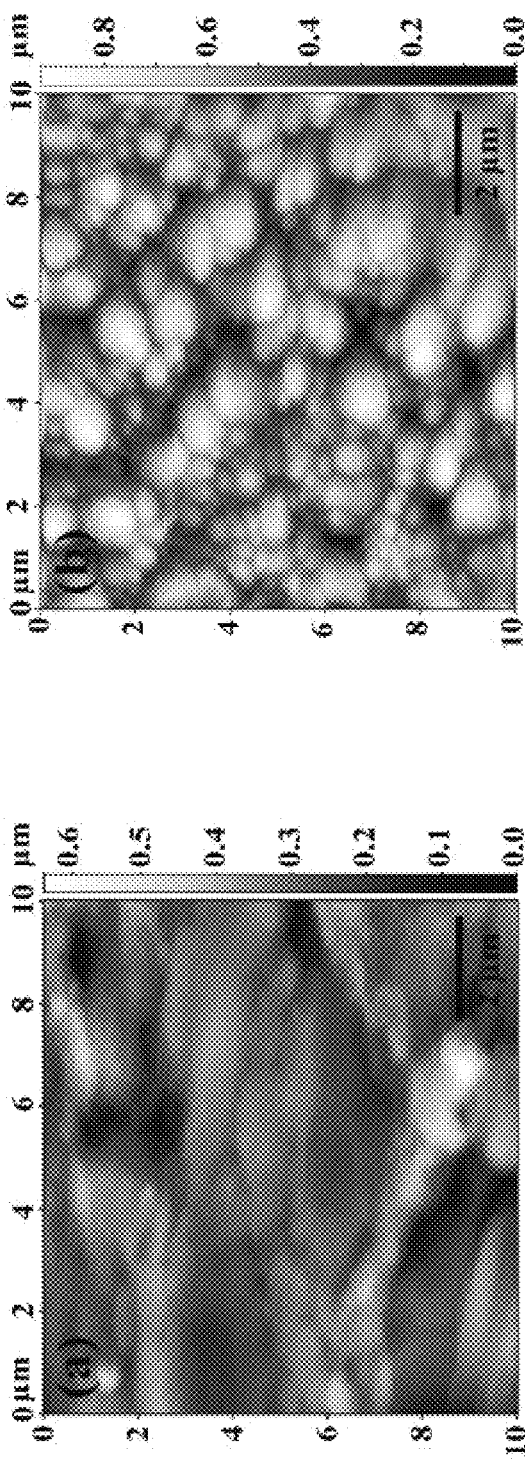
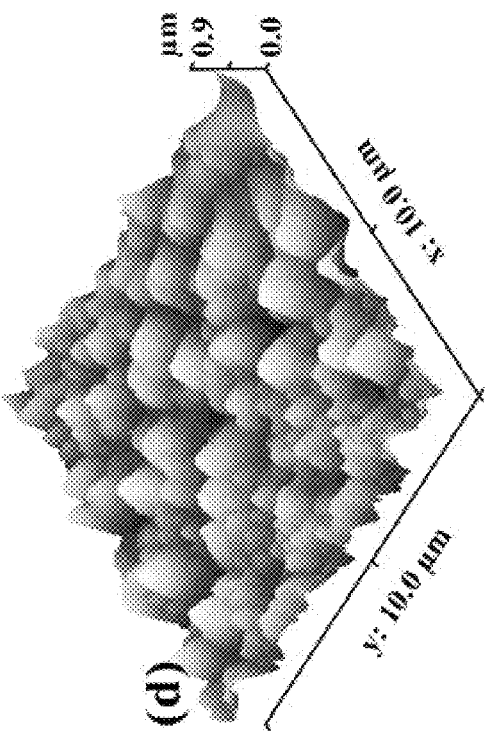
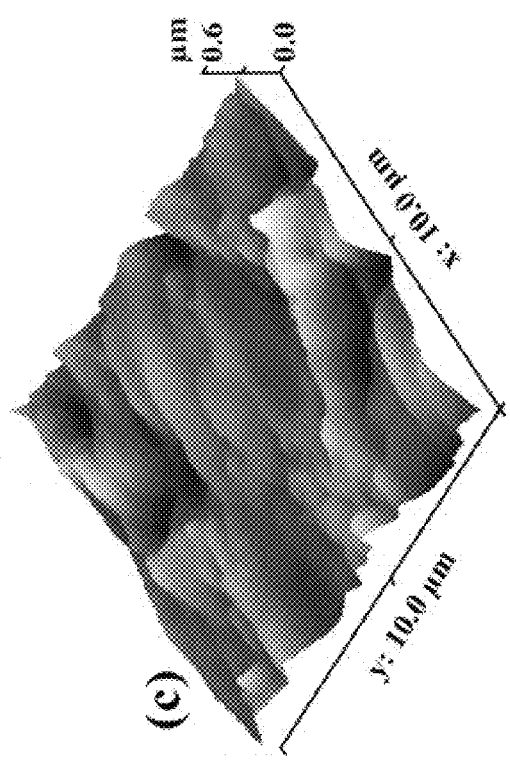
FIG. 2(a)
FIG. 2(b)
FIG. 2(c)
FIG. 2(d)

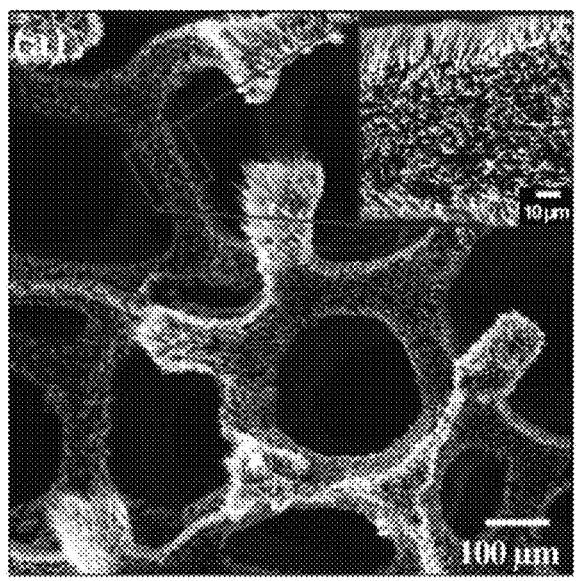
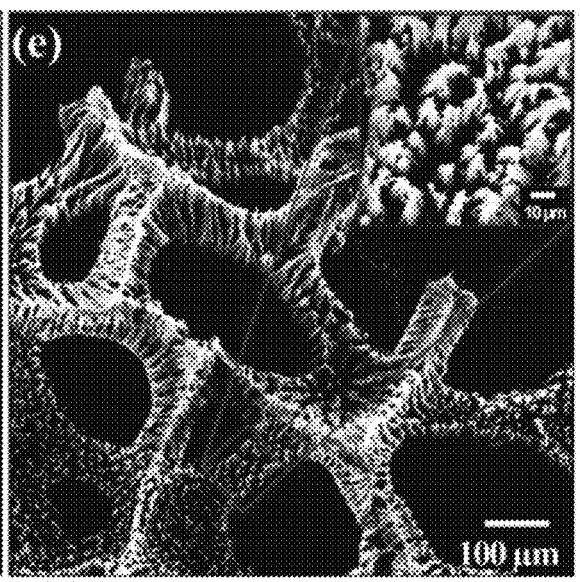
FIG. 3(a)　　　　　　　　　　　　FIG. 3(e)
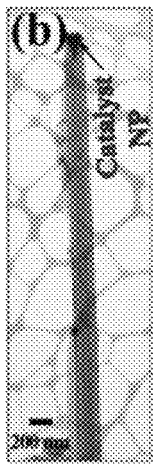 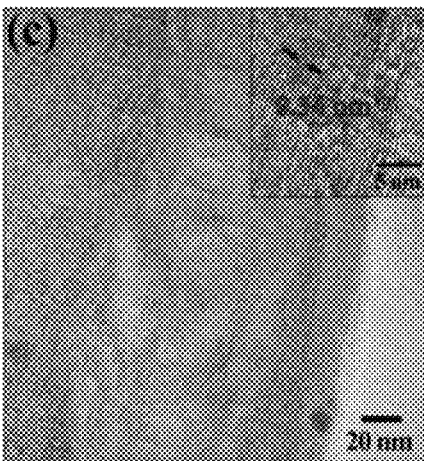 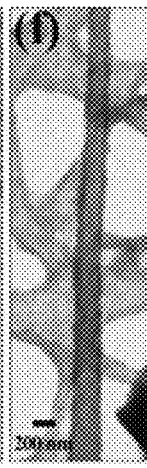 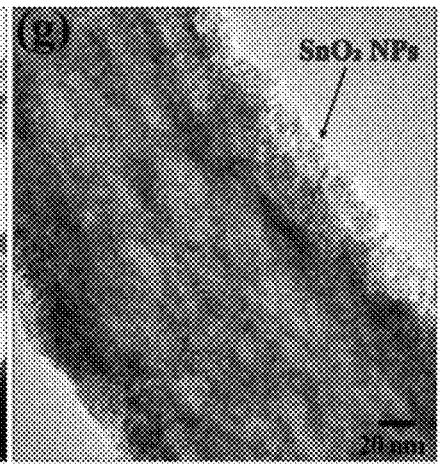
FIG. 3(b)　　FIG. 3(c)　　　　　FIG. 3(f)　　FIG. 3(g)
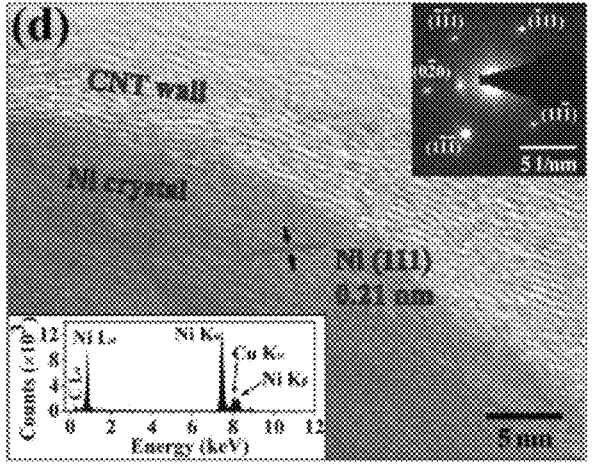 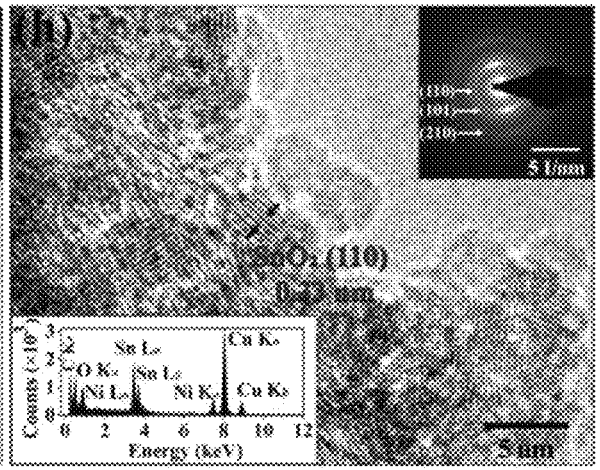
FIG. 3(d)　　　　　　　　　　　　FIG. 3(h)

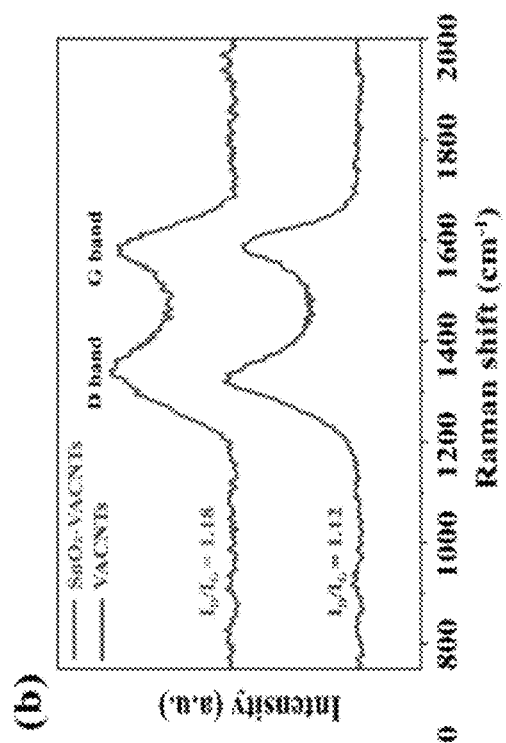
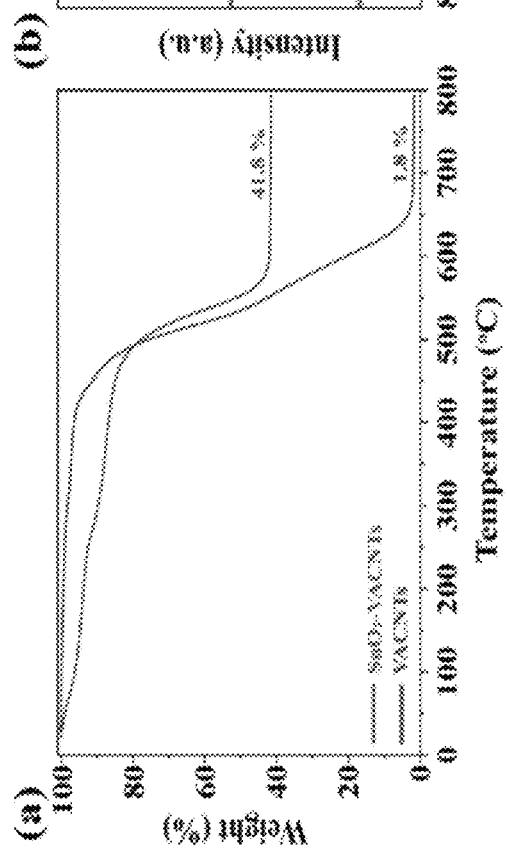
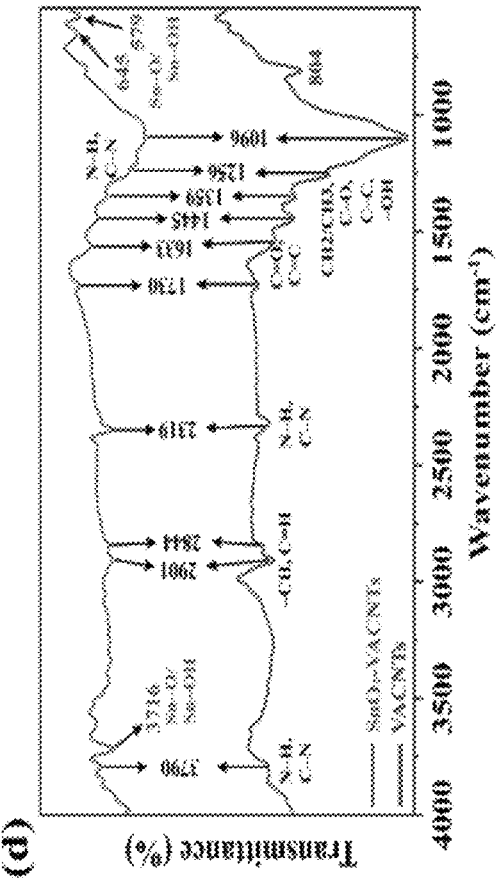
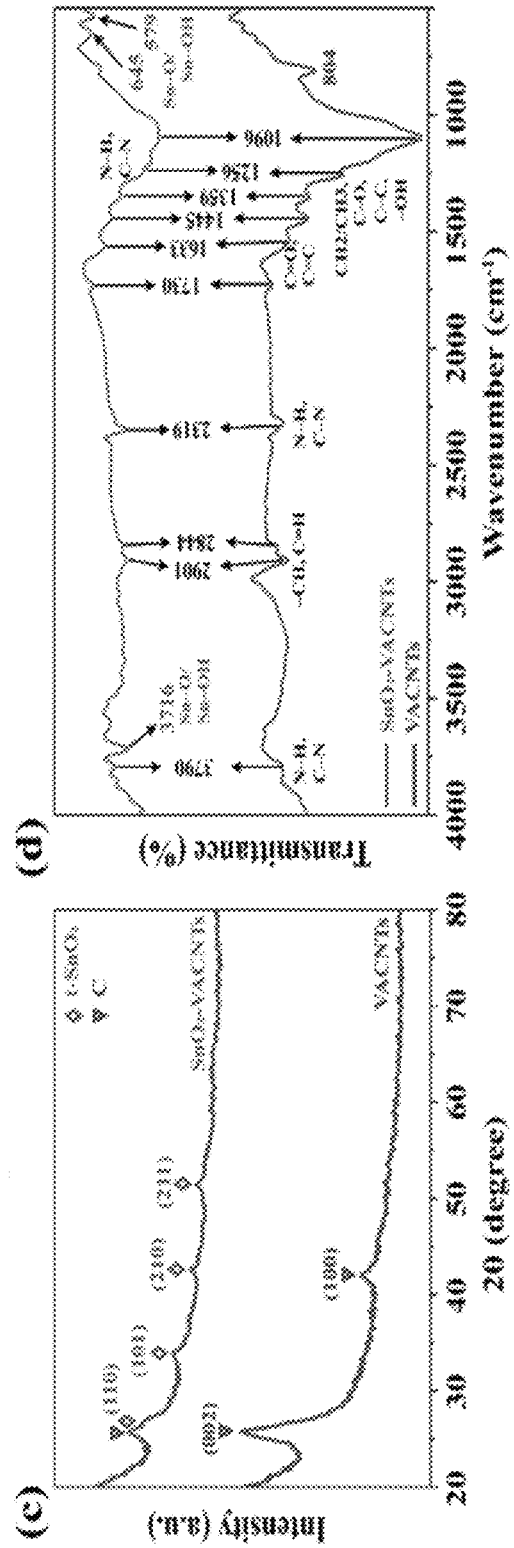
FIG. 4(a)
FIG. 4(b)
FIG. 4(c)
FIG. 4(d)

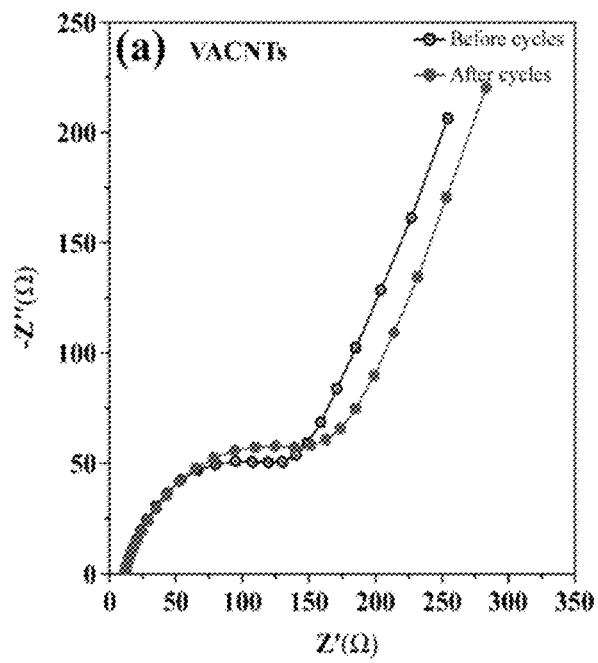 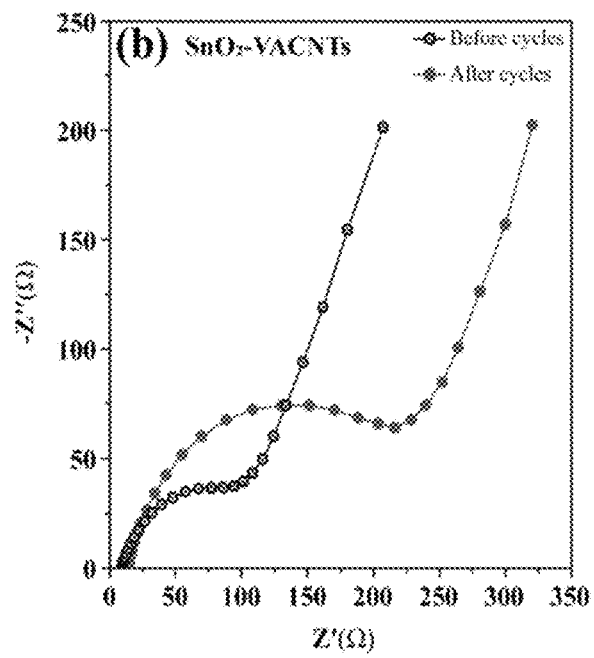
FIG. 7(a)                FIG. 7(b)
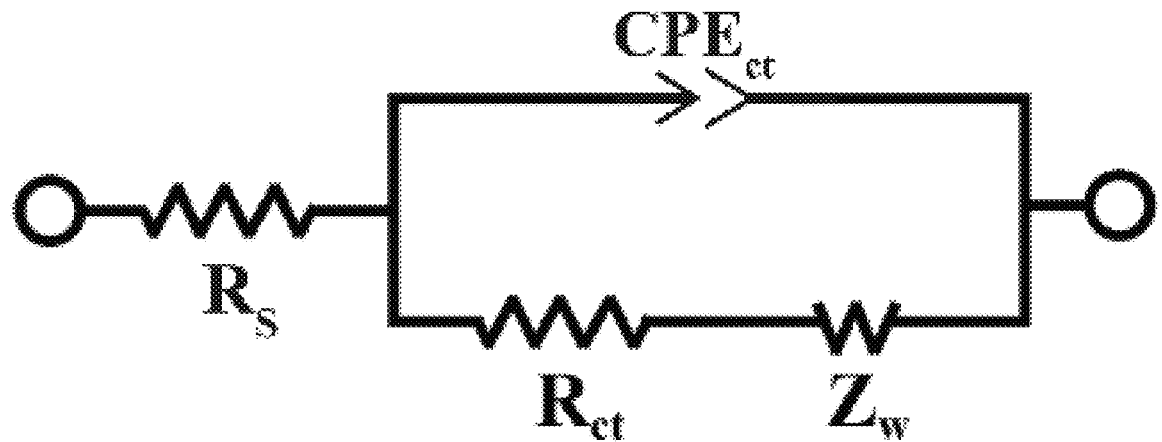
FIG. 8

| Electrode materials | | $R_s$ ($\Omega$) | $R_{ct}$ ($\Omega$) |
|---|---|---|---|
| VACNTs | | | |
| | Before cycling | 11.3 | 113.6 |
| | After cycling | 10.8 | 144.2 |
| SnO$_2$-VACNTs | | | |
| | Before cycling | 9.4 | 67.8 |
| | After cycling | 13.8 | 165.1 |

FIG. 9

COATED VERTICALLY ALIGNED CARBON NANOTUBES ON NICKEL FOAM

CROSS-REFERENCE TO RELATED APPLICATION

The present application is a continuation application of U.S. application Ser. No. 17/471,313, filed Sep. 10, 2021, the disclosure of which is hereby incorporated by reference in its entirety, including all figures, tables, and drawings.

GOVERNMENT SUPPORT

This invention was made with government support under DMR-1506640 awarded by National Science Foundation (NSF). The government has certain rights in the invention.

BACKGROUND

Lithium (Li)-ion batteries (LIBs) have become an essential part of everyday life due to their increasing applications, extending from portable electronics to electric vehicles. LIBs are one of the energy storage and power devices based on electrochemical energy storage and conversion mechanisms. Owing to the excellent properties of LIBs, such as superior energy density, a broader operating temperature range, a low self-discharge rate, and devoid of memory effect, they are superior among other battery technologies. However, the ever-increasing demand for LIBs capable of delivering high energy and power densities with minimal volumetric constraints and safety issues requires better LIB components with enhanced electrochemical properties.

BRIEF SUMMARY

Embodiments of the subject invention provide novel and advantageous vertically aligned carbon nanotubes (VACNTs) (e.g., multi-walled VACNTs (MW-VACNTs) and methods of synthesizing the same. VACNTs can be synthesized on nickel foam (Ni—F), for example by using a plasma-enhanced chemical vapor deposition (PECVD) technique. A wet chemical method can then be used to coat a layer on the VACNTs, for example a layer of nanoparticles such as tin oxide ($SnO_2$) nanoparticles. $SnO_2$-coated VACNTs on Ni—F have excellent lithium (Li)-ion storage capacity and can be used as a material for an anode in high-performance Li-ion batteries (LIB s).

In an embodiment, a method of synthesizing VACNTs can comprise: providing a metal substrate (e.g., a Ni—F substrate (e.g., a three-dimensional (3D) Ni—F substrate)) in a reaction chamber; lowering a pressure (e.g., to below 1 Torr, such as 0.01 Torr) of the reaction chamber (e.g., via pumping the reaction chamber) and providing a carbon precursor gas (e.g., acetylene) to the chamber to perform a PECVD process to synthesize the VACNTs on the substrate; and performing a wet chemical process on the VACNTs connected to the substrate to coat the VACNTs with nanoparticles such that the VACNTs have a coating of the nanoparticles on respective outer walls thereof. The PECVD process can further comprise providing the carbon precursor gas in the presence of ammonia and/or performing the PECVD process at a temperature of at least 400° C. (e.g., 600° C. or about 600° C.). DC plasma (e.g., of 70 Watts (W) or about 70 W) can be applied at a given pressure (e.g., 7 Torr or about 7 Torr) while the carbon precursor gas is provided. The VACNTs can be MW-VACNTs. The method can further comprise, after performing the PECVD process, performing an acid treatment on the VACNTs connected to the substrate to form oxygen-containing functional groups on the respective outer walls of the VACNTs. The acid treatment can comprise providing a first acid (e.g., nitric acid ($HNO_3$)) to the VACNTs for a first predetermined amount of time (e.g., at least 10 minutes, such as 15 minutes or about 15 minutes). The oxygen-containing functional groups can comprise carboxyl groups and/or hydroxyl groups. The nanoparticles can be $SnO_2$ nanoparticles. The wet chemical process can comprise providing tin (II) chloride dihydrate ($SnCl_2 \cdot 2H_2O$) and oxygen ($O_2$) to the VACNTs. The wet chemical process can comprise: forming a precursor solution comprising a second acid (e.g., hydrochloric acid (HCl)) and $SnCl_2 \cdot 2H_2O$; and submerging the VACNTs on the substrate in the precursor solution while providing $O_2$ for a second predetermined amount (e.g., at least 1 hour, such as 9 hours or about 9 hours) of time such that the $SnO_2$ nanoparticles coat the respective outer walls of the VACNTs. The VACNTs can be binder-free (i.e., contain no binder) and/or free of conductive additive materials (i.e., contain no conductive additive materials).

In another embodiment, a compound can comprise: a metal substrate (e.g., a Ni—F substrate (e.g., a 3D Ni—F substrate)); VACNTs disposed on and connected to the substrate; and a coating of the nanoparticles on respective outer walls of the VACNTs. The nanoparticles can be, for example, $SnO_2$ nanoparticles. The VACNTs can be MW-VACNTs. The VACNTs can be binder-free (i.e., contain no binder) and/or free of conductive additive materials (i.e., contain no conductive additive materials). The VACNTs can comprise oxygen-containing functional groups (e.g., carboxyl groups and/or hydroxyl groups) on the respective outer walls thereof.

In another embodiment, an LIB can comprise: a cathode (e.g., a cathode comprising lithium); an anode comprising a compound as described herein (comprising VACNTs on a metal substrate (e.g., a Ni—F substrate)); and an electrolyte disposed between the cathode and the anode.

BRIEF DESCRIPTION OF DRAWINGS

FIGS. 2(a)-2(d) show atomic force microscope (AFM) views of Ni—F (single strip) before and after a heat treatment at 600° C. under an ammonia ($NH_3$) environment for 6 minutes. FIG. 2(a) shows the surface of the Ni—F before the heat treatment, and FIG. 2(b) shows the surface of the Ni—F after the heat treatment. The scale bar in each of FIGS. 2(a) and 2(b) is 2 micrometers (µm). FIG. 2(c) is a three-dimensional (3D) view of FIG. 2(a), and FIG. 2(d) is a 3D view of FIG. 2(b).

FIG. 3(a) is a scanning electron microscope (SEM) image of VACNTs grown on Ni—F. The scale bar is 100 µm. The inset is a magnified view of the boxed area. The scale bar of the inset is 10 µm.

FIG. 3(b) is a low-magnification transmission electron microscope (TEM) image of a VACNT. The scale bar is 200 nanometers (nm).

FIG. 3(c) is a high-magnification TEM image of a VACNT. The scale bar is 20 nm. The inset shows a high-resolution TEM image showing the lattice fringes in the VACNT wall. The scale bar of the inset is 5 nm.

FIG. 3(d) is a TEM image at the interface between the graphitic layers of a VACNT and a catalyst particle. The scale bar is 5 nm. The upper-right inset is the selected area diffraction (SAD) pattern of the catalyst particle trapped at the tip of the VACNT. The scale bar in this inset is 5 nm$^{-1}$. The lower-left inset is the energy-dispersive X-ray spectroscopy (EDS) spectrum of the catalyst particle trapped at the tip of the VACNT.

FIG. 3(e) is an SEM image of $SnO_2$-coated VACNTs ($SnO_2$-VACNTs) grown on Ni—F. The scale bar is 100 μm. The inset is a magnified view of the boxed area. The scale bar of the inset is 10 μm.

FIG. 3(f) is a low-magnification TEM image of an $SnO_2$-VACNT composite. The scale bar is 200 nm.

FIG. 3(g) is a high-magnification TEM image of an $SnO_2$-VACNT composite. The scale bar is 20 nm.

FIG. 3(h) is a TEM image at the interface between the graphitic layers of a VACNT and the $SnO_2$ nanoparticles. The scale bar is 5 nm. The upper-right inset is the SAD pattern of the $SnO_2$ nanoparticle. The scale bar in this inset is 5 nm$^{-1}$. The lower-left inset is the EDS spectrum of the $SnO_2$ nanoparticle.

FIG. 4(a) shows the thermogravimetric analysis (TGA) spectra for pristine VACNTs and $SnO_2$-VACNTs. The curve with the higher weight percentage value at a temperature of 800° C. is for the $SnO_2$-VACNTs.

FIG. 4(b) shows the Raman spectra for pristine VACNTs and $SnO_2$-VACNTs. The curve on top is for the $SnO_2$-VACNTs.

FIG. 4(c) shows the X-ray diffraction (XRD) spectra for pristine VACNTs and $SnO_2$-VACNTs. The curve on top is for the $SnO_2$-VACNTs.

FIG. 4(d) shows the Fourier transform infrared spectroscopy (FTIR) spectra for nitric acid ($HNO_3$)-treated VACNTs and $SnO_2$-VACNTs. The curve on top is for the $SnO_2$-VACNTs.

FIG. 7(a) shows a plot of −Z" (in Ohms (Ω)) versus Z' (in Ω), showing the impedance spectra for VACNTs before and after the discharge-charge cyclic process. The curve with the higher value of −Z" at Z'=200Ω is for the before cycles.

FIG. 7(b) shows a plot of −Z" (in Ω) versus Z' (in Ω), showing the impedance spectra for $SnO_2$-VACNTs before and after the discharge-charge cyclic process. The curve with the higher value of −Z" at Z'=200Ω is for the before cycles.

FIG. 8 shows an equivalent Randle's circuit model used for fitting experimental impedance data.

FIG. 9 shows a table of impedance parameters of VACNTs and $SnO_2$-VACNTs as anode materials calculated from an equivalent Randle's circuit.

DETAILED DESCRIPTION

Figure 1:
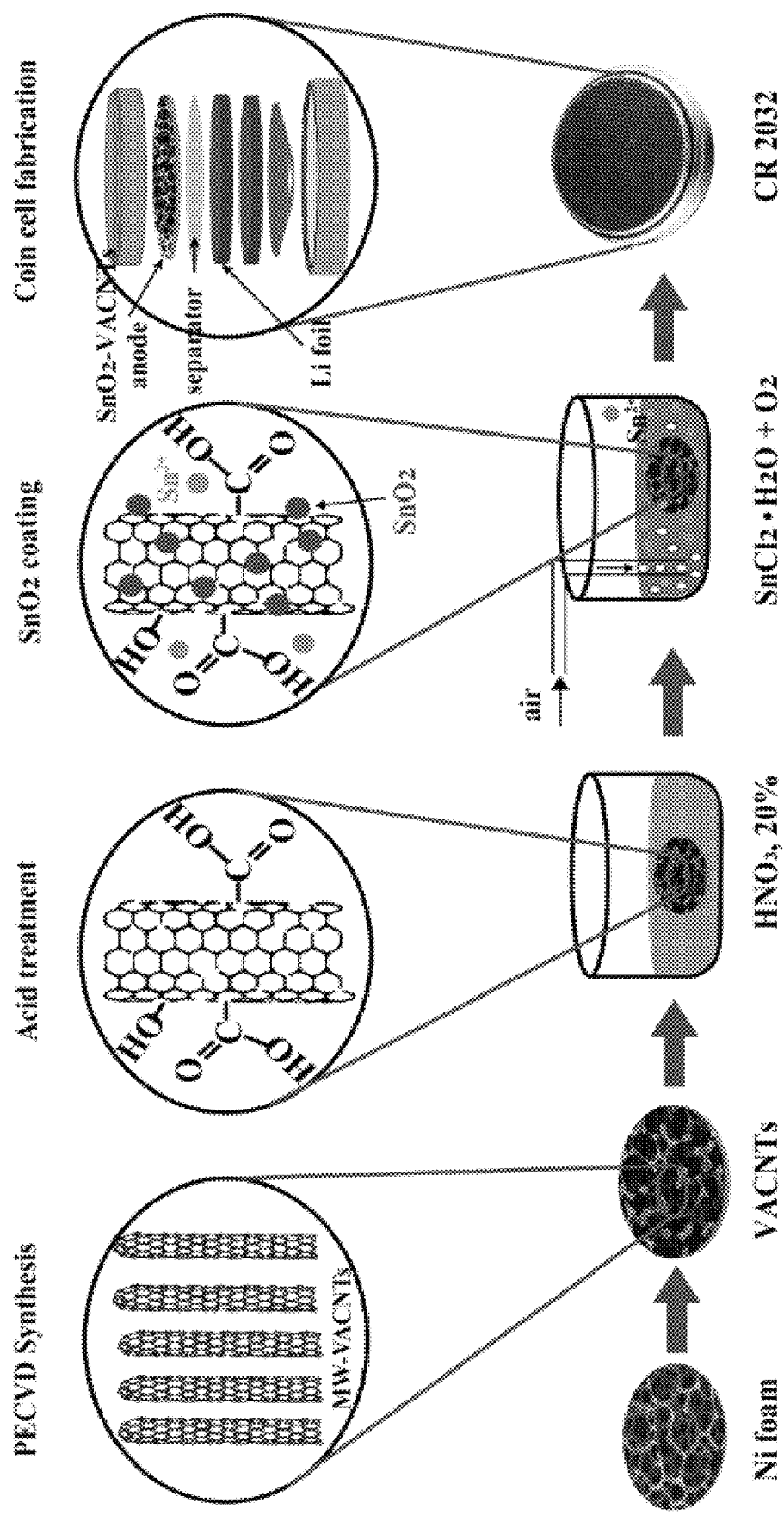
FIG. 1 shows a schematic view of synthesis of vertically aligned carbon nanotubes (VACNTs) on nickel foam (Ni—F), coating with tin oxide ($SnO_2$), and fabrication of a CR2032 lithium (Li)-ion coin cell, according to embodiments of the subject invention.

Embodiments of the subject invention provide novel and advantageous vertically aligned carbon nanotubes (VACNTs) and methods of synthesizing the same. VACNTs can be synthesized on nickel foam (Ni—F), for example by using a plasma-enhanced chemical vapor deposition (PECVD) technique. A wet chemical method can then be used to coat a layer on the VACNTs, for example a layer of nanoparticles such as tin oxide ($SnO_2$) nanoparticles. $SnO_2$-coated VACNTs on Ni—F have excellent lithium (Li)-ion storage capacity and can be used as a material for an anode in high-performance Li-ion batteries (LIBs).

The $SnO_2$-coated VACNTs can be denoted as $SnO_2$-VACNTs, and the $SnO_2$-VACNTs on Ni—F can be denoted as $SnO_2$-VACNTs/Ni—F. The VACNTs grown on Ni—F can also be coated or encapsulated with other metals, metal oxides, semiconducting materials, and/or alloys to form composite materials. The coated or encapsulated VACNTs of embodiments of the subject invention can have applications in sensors, electron emitters, and energy storage.

High capacity, electrochemically active $SnO_2$ materials are one of the most promising candidates for replacing graphite in developing high-performance LIBs. Despite the tremendous potential of $SnO_2$ as an anode material, structural pulverization led by the significant volume changes during electrochemical redox restricts the cycling stability of LIBs. The conventional bilayer anode design consisting of a binder and conductive additive materials can seriously reduce the usable capacity of LIBs and limit the potential application of LIBs at high temperatures. Embodiments of the subject invention synthesize binder-free and conductive additive-free, self-standing $SnO_2$-VACNTs on three-dimensional (3D) Ni—F. This material can be directly used, for example, as anode materials for LIBs without the need for binders, conductive additives, and/or an extra current collector. The coated $SnO_2$ particles can have small diameters (e.g., less than 10 nanometers (nm) or even less than 5 nm), which can shorten the diffusion routes of the Li ions and possibly mitigate the volume change by reducing the strains during the Li insertion and extraction. In addition, the free-standing $SnO_2$-VACNTs with proper spacings can buffer the volume instability and offer better electrolyte accessibility, thereby providing more favorable Li-ion transportation kinetics at the electrode/electrolyte interfaces. The direct growth of the VACNTs on the Ni—F also provides enhanced mechanical strength, which will improve the stability of the $SnO_2$-VACNTs/Ni—F when used as LIB anode materials.

Carbon nanotubes (CNTs) have demonstrated the potential for application as the anode of LIBs because of their unique one-dimensional tubular structure, large surface area, short diffusion length of $Li^+$ ions, and high electrical and thermal conductivity. CNTs are regarded as excellent materials to store lithium ions (capacity of about 1000 milliamp-hours per gram (mAh/g)) compared to the state-of-art graphite anode (372 mAh/g). The possibility of using CNTs as the anode material in LIBs for charge storage has been considered, and CNTs have been excellent additive materials to improve the electrochemical performance of electrode materials with much-improved energy conversion, storage capacities, and charge transferability.

The experimental specific capacity of CNT anodes has shown to be below 400 mAh/g, which is a low value compared to the demands for the high energy and power densities of LIBs. One of the main reasons causing the low specific capacity of the CNT anode is its conventional bilayer design. A thin layer of CNTs is glued onto a copper foil current collector with the help of a binder. The binder limits the potential application of batteries above 200° C., whereas the copper foil itself is not involved in the electrochemical reaction. The bilayer design of the LIB anode can reduce the usable capacity by about 47%, meaning that LIBs should use free-standing, binder-free CNTs anodes.

High-capacity metal and semiconductor materials such as aluminum (Al) (800 mAh/g), tin (Sn) (994 mAh/g), lithium (Li) (3860 mAh/g), silicon (Si) (4000 mAh/g), and germanium (Ge) (1600 mAh/g) have been explored to improve the specific and volumetric capacity of LIB anodes. Despite having high $Li^+$ storage capacity, colossal volume instability during the lithiation/delithiation leads to pulverization of the anode material and loss of inter-particle contact resulting in rapid capacity fading and severe safety issues. Other anode materials include hybrid materials comprising high-capacity nanoparticles (less than 100 nm) and CNTs to address inherent concerns of bulk electrode materials. The reduced particle size may modify the volumetric alteration mechanism, and simultaneously using CNTs can absorb the considerable stress developed during the lithiation and delithiation process. The high electrical conductivity of CNTs can enhance the performance of LIBs because it offers a quick pathway for charged particles during the battery operation. CNTs coated with $SnO_2$ nanoparticles ($SnO_2$-CNTs) as an anode of LIBs is attractive because the theoretical charge storage capacity of $SnO_2$ (781 mAh/g) is over twice as much as that of graphite anodes.

Fabrication of $SnO_2$-CNTs composites as anode materials focuses on using wet chemical methods on randomly oriented CNTs. However, $SnO_2$-VACNTs of embodiments of the subject invention can surprisingly and significantly improve the battery performance by offering better electrolyte accessibility and charge transfer capability obtained from the ordered structure and inter-tube space of the VACNTs array. Improved contact resistance between VACNTs and current collectors achieved through the direct synthesis of VACNTs on metal substrates and anisotropic conductivities of VACNTs can also enhance the charge transfer and adequate dissipation of heat caused by resistive heating. A proper inter-tube distance in an array of VACNTs can alleviate the stress developed during the lithiation/delithiation process. Hence, it is essential to fabricate binder-free VACNT templates directly on metal substrates to accommodate a uniform coating of $SnO_2$ nanoparticles for achieving high-performance LIB anodes.

Embodiments of the subject invention provide arrays of free-standing, binder-free VACNTs synthesized directly on 3D nickel foil or Ni—F using a PECVD method. The as-synthesized VACNTs can be coated (e.g., with nanoparticles such as $SnO_2$ nanoparticles) to form core-shell structures (e.g., $SnO_2$-VACNTs) via a wet chemical method. The electrochemical lithiation performance of the pristine VACNTs and $SnO_2$-VACNTs when used as an anode material has been evaluated in a half cell configuration (see the examples). The $SnO_2$-VACNTs composite anode exhibited a significantly higher specific capacity of about 1891 mAh/g at a current density of 0.1 Amps per gram (A/g) than that of the pristine VACNTs (about 520 mAh/g). Further, the $SnO_2$-VACNTs composite demonstrated a capacity of more than 900 mAh/g even at a high current density of 1 A/g, which is a significant improvement over the current graphite anodes of LIBs.

The $SnO_2$-VACNTs/Ni—F of embodiments of the subject invention have excellent Li-ion storage capacity. The material can be used, for example, as anode materials for developing high-performance LIBs. The $SnO_2$-VACNTs synthesized on other metal foam or networks can also have excellent Li-ion storage capacity and can be used as anode materials for developing high-performance LIBs. The $SnO_2$-VACNTs synthesized on Ni—F or other metal foam or networks would also be expected to have excellent sodium-ion storage capacity and can therefore be used as anode materials for developing high-performance sodium-ion batteries. The $SnO_2$-VACNTs synthesized on Ni—F or other metal foam or networks can have applications in developing high-performance supercapacitors, and/or sensors (e.g., gas and/or chemical sensors).

By controlling the synthesis conditions in embodiments of the subject invention, the density and/or length of the VACNTs can be controlled. Also, by controlling the synthesis conditions, the coating amount, layer thickness, and/or particle size of the $SnO_2$ on the VACNTs can be controlled. The techniques can be applied to other metal foam or metal networks or metal alloy networks besides Ni—F (for example, iron foam, stainless steel foam, stainless steel mesh, cobalt foam, copper foam, nickel-iron alloy mesh, etc.) to synthesize VACNTs thereon.

Other metals, metal oxides, semiconducting materials, and/or alloys (e.g., $ZnO_2$, $V_2O_5$, $MnO_2$, NiO, Sn, Si, Cu, Ge, NiCo, etc.) can be coated on the VACNTs by using either a wet chemical method, physical (thermal) vapor deposition, or chemical vapor deposition to form composite materials. These composite materials can be used for LIBs, supercapacitors, catalysis, sensors, electron emitters, etc.

Embodiments of the subject invention allow for the large-scale synthesis of $SnO_2$-VACNTs on 3D Ni—F to meet various application requirements. The composite materials of embodiments of the subject invention have potential applications in bio/chemical sensors, electron emitters, environmental protection (e.g., applications for removing heavy metal ions and contaminants from water and purifying the air), energy storage (e.g., applications for LIBs, supercapacitors, solar cells, etc.), energy production (e.g., applications for water splitting to generate oxygen and hydrogen, clean energy sources), and/or synthesis of metal-, metal oxide-, metal sulfide-, alloy-, and/or semiconductor-coated VACNTs on Ni—F to form new functional materials.

The following also discuss VACNTs and are each hereby incorporated by reference herein in their respective entireties: U.S. Pat. Nos. 10,336,618, 10,968,103, 10,961,123, U.S. patent application Ser. No. 17/363,395, U.S. patent application Ser. No. 16/850,687, U.S. patent application Ser. No. 17/201,464, Thapa et al. (Direct growth of vertically aligned carbon nanotubes on stainless steel by plasma enhanced chemical vapor deposition, Diamond & Related Materials, 90 (2018), 144-153), and Jungjohann et al. (Improving field emission properties of vertically aligned carbon nanotube arrays through a structure modification, J. Mater. Sci., 55:2101-2117, 2019).

When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

The transitional term "comprising," "comprises," or "comprise" is inclusive or open-ended and does not exclude additional, unrecited elements or method steps. By contrast, the transitional phrase "consisting of" excludes any element, step, or ingredient not specified in the claim. The phrases "consisting" or "consists essentially of" indicate that the claim encompasses embodiments containing the specified materials or steps and those that do not materially affect the basic and novel characteristic(s) of the claim. Use of the term "comprising" contemplates other embodiments that "consist" or "consisting essentially of" the recited component(s).

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to the invention.

Materials and Methods

Figure 10:
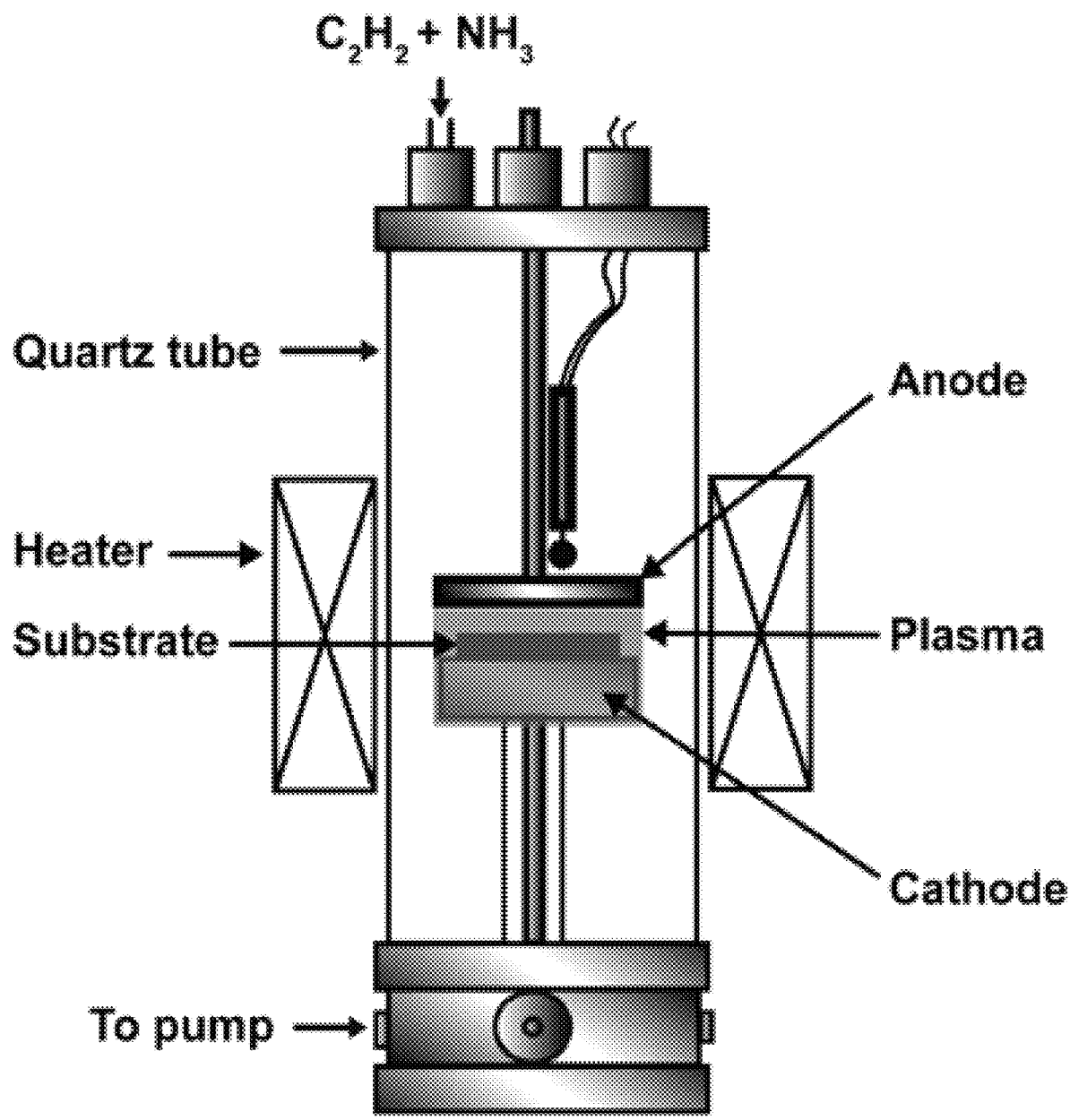
FIG. 10 shows a schematic view of a plasma-enhanced chemical vapor deposition (PECVD) system that can be used to synthesize VACNTs, according to an embodiment of the subject invention. The VACNTs can be $SnO_2$-coated VACNTs and can be synthesized on Ni—F (e.g., 3D Ni—F).

Free-standing, binder-free VACNTs were synthesized on 3D Ni—F via PECVD. An apparatus as shown in FIG. 10 was used, and a detailed description of the system can be found in Thapa et al. (2018, supra.) and U.S. Pat. No. 10,961,123, both of which are hereby incorporated herein by reference in their entireties. In brief, as-received Ni—F (1.6 millimeters (mm) thick) was cut into circular disks of diameter about 1 centimeter (cm). They were loaded into the PECVD chamber after being cleaned ultrasonically in an acetone and isopropyl alcohol bath for 10 minutes (min), and then the chamber was pumped down to the pressure of 0.01 Torr. VACNTs were synthesized at 600° C. for 7 min by using acetylene (25 standard cubic centimeters per minute (sccm)) as a carbon precursor gas in the presence of ammonia gas (400 sccm) while DC plasma of 70 Watts (W) was applied at the pressure of 7 Torr. The $SnO_2$-coated VACNTs ($SnO_2$-VACNTs) composite was prepared at room temperature by a simple wet-chemical method (see also; Han et al., Coating Single-Walled Carbon Nanotubes with Tin Oxide, Nano Letters 3(5) (2003) 681-68; and Li et al., Improving field emission properties of vertically aligned carbon nanotube arrays through a structure modification, Journal of Materials Science 55(5) (2020) 2101-2117; both of which are hereby incorporated herein by reference in their entireties). The as-synthesized VACNT arrays (not separated from original Ni—F) were treated with nitric acid ($HNO_3$, 20%) for 15 min to create the oxygen-containing functional groups on the VACNT wall. A precursor solution was prepared by mixing 1 gram (g) of tin (II) chloride ($SnCl_2$, 98%, anhydrous) in 80 milliliters (mL) of deionized water, and then 1.4 mL of hydrochloric acid (HCl, 38%) was added. The acid-treated VACNT samples, first rinsed with deionized water, were submerged into the solution for 9 hours. The solution was stirred by the gentle flow of air through the solution continuously to facilitate the coating process. The samples were taken out from the solution and dried at 95° C. for 15 min.

The morphology of the pristine VACNTs and $SnO_2$-VACNTs composite was analyzed by using a scanning electron microscope (SEM, JEOL JSM-6330F). Transmission electron microscopy (TEM) images, energy-dispersive X-ray spectra (EDS), and selected area electron diffraction (SAD) patterns were collected by using an FEI Tecnai F30 high-resolution transmission electron microscope with an acceleration voltage of 300 kilovolts (kV). The thermal analysis was performed using the thermogravimetric-differential scanning calorimetry analysis (TG/DSC, SDT Q600 V20.9, USA) at a heating rate of 10° C./min under airflow. Structural defects on the VACNTs before and after coating with $SnO_2$ nanoparticles were characterized by Raman spectroscopy (Ar+ laser excitation, wavelength 632.8 nm). The crystal structure of the $SnO_2$-VACNTs was confirmed by X-ray diffraction (XRD) experiments using Siemens Diffraktometer D5000 with Cu (Kα) radiation ($\lambda$=1.54 Å) at the step size of 0.02° ranging from 20° to 80° at a speed of 2°/min. The functional groups created after the acid treatment and $SnO_2$ coating on the CNT wall were analyzed using a Fourier transform infrared spectrometer (Jasco, FTIR-4100). CR2032 coin cells (half-cell configuration with Li foil as both counter and reference electrode) were assembled inside an argon (Ar)-filled glove box using pristine VACNTs and $SnO_2$-VACNTs composites fabricated on Ni foams as the anode. 1M $LiPF_6$ in EC:DEC (1:1, vol. %) was used as an electrolyte; whereas, a Celgard polypropylene film was used to separate the anode and cathode. The electrochemical measurements were carried out on a VMP3 Bio-Logic potentiostat. FIG. 1 shows the steps of VACNT synthesis, coating with $SnO_2$, and the Li-ion coin cell fabrication.

Example 1

Free-standing, binder-free VACNT templates for accommodating the high-capacity $SnO_2$ nanomaterials were synthesized directly on 3D Ni—F by the PECVD method. The on-site decomposition of hydrocarbon gas into carbon atoms, diffusion into the catalyst nanoparticles/nano-hills, and precipitation on the catalyst surface to enable the CNT graphitization are essential steps in the VACNT synthesis process. The presence of catalytically active growth sites on the substrate is crucial when a catalytic metal substrate is preferred over the substrate coated with a thin film of transition metals. FIGS. 2(a)-2(d) show the surface morphology of Ni—F before and after the heat treatment at 600° C. in an $NH_3$ environment for 6 min. As shown in FIGS. 2(a) and 2(c), pristine Ni foam had a relatively smooth surface with an average roughness $R_a$=53.68 nm. After the heat treatment, the Ni foam was much rougher with $R_a$=105 nm, as shown in FIGS. 2(b) and 2(d). Most importantly, uniform nano-hills were evolved on the Ni—F surface after the heat treatment under the reducing environment, which was crucial for the nucleation of the VACNTs.

FIG. 3(a) shows an SEM image of a well-aligned, self-standing, and uniform array of VACNTs synthesized on the Ni—F. The inset of FIG. 3(a) depicts a high magnification SEM image of the boxed area shown in FIG. 3(a). The diameter of VACNTs ranged from 150 nm to 270 nm, and the length was about 5 micrometers (μm) for the VACNTs.

FIGS. 3(b) and 3(c) show low and a high magnification, respectively, TEM images of VACNTs, which confirmed a tubular "bamboo-like" structure of VACNTs with a catalyst nanoparticle at the tip, a characteristic of the VACNTs synthesized via PECVD at a low temperature. As shown in the inset of FIG. 3(c), the high-resolution TEM image revealed the lattice fringes separated by a distance of 0.34 nm in the VACNT wall, indicating the multiwalled CNTs. FIG. 3(d) is a high-resolution TEM image of the interface between the VACNT wall and the catalyst particle, and it shows the lattice planes separated by 0.21 nm, which corresponds to the (111) lattice plane of face-centered cubic (FCC) Ni crystal. The typical electron diffraction pattern of the Ni nanoparticle trapped at the tip of the VACNT is shown in the upper-right inset of FIG. 3(d). The distinct diffraction spots can be assigned to $(0\bar{2}0)$, $(\bar{1}11)$, and $(\bar{1}11)$ planes of pure FCC Ni along the [101] zone axis. As shown in the lower-left inset of FIG. 3(d), the EDS spectrum confirmed the nanoparticle as a Ni metal nanoparticle, where the carbon (C) and copper (Cu) signals can be ascribed to the VACNT wall and TEM holder, respectively.

FIG. 3(e) shows a uniquely bundled $SnO_2$-VACNTs structure formed after the solution phase $SnO_2$ coating procedure with VACNT tips touching each other. The active material ($SnO_2$-VACNTs) yield was 1.02-1.21 milligrams per square centimeter ($mg/cm^2$) for the VACNTs synthesis period of 6 min and $SnO_2$ coating duration of 9 hours. Low and high magnification TEM images shown in FIGS. 3(f) and 3(g), respectively, illustrate the coating of the VACNT by a thin layer (about 20 nm) of $SnO_2$ nanoparticles, forming a core-shell structure. As shown in FIG. 3(h), the high-resolution TEM image confirmed the crystalline phase of the $SnO_2$ nanoparticle and demonstrated lattice planes separated by 0.33 nm related to the (110) plane of the tetragonal $SnO_2$. The upper-right inset of FIG. 3(h) represents the typical electron diffraction pattern of the $SnO_2$-VACNT composite. The concentric diffraction rings can be indexed as (110), (101), and (210) planes related to the polycrystalline phase of tetragonal $SnO_2$. As shown in the lower-left inset of FIG. 3(h), the presence of Sn, oxygen (O), and C in the EDS spectrum further established the material as the $SnO_2$-VACNT core-shell, where the signals such as Ni and Cu can be ascribed to the catalyst particle and TEM grid, respectively.

Thermogravimetric analysis (TGA) was performed to determine the $SnO_2$ loading on the $SnO_2$-VACNTs composite. FIG. 4(a) shows the TGA profiles of the pristine VACNTs and $SnO_2$-VACNTs composite sample. Both samples exhibited typical weight loss due to moisture removal below 400° C., although the composite showed more significant weight loss, which can be accredited to the solution-based $SnO_2$ coating procedure. The composite displayed a rapid weight loss starting at about 463° C., and the pristine VACNTs sample showed an abrupt weight loss at about 425° C. The thermal stability of $SnO_2$ powder with a particle size of about 10 nm has been shown up to 900° C. The final residual weights of both samples were expected to have all the carbonaceous species burned off by 700° C., leaving behind the dry mass of $SnO_2$ and any impurities in the VACNTs. The $SnO_2$ mass loading of the composite was determined to be about 40% of the total mass of $SnO_2$-VACNTs from the TGA spectra, which is the final residual mass percentage remaining at 800° C. after subtracting the final mass remaining by the VACNTs. As shown by Raman spectra in FIG. 4(b), the coating with $SnO_2$ slightly increased the defects on the VACNTs, which is evident from the increase in the intensity ratio of D-band and G-band (ID/IG) from 1.12 to 1.18. The higher defects on the $SnO_2$-VACNTs can be accredited to the treatment of VACNTs with $HNO_3$ acid before being coated with $SnO_2$. It is important to note that the acid treatment was crucial to creating oxygen-containing functional groups on the VACNTs wall to assist the coating process. The crystallographic structure of the pristine VACNTs and $SnO_2$-VACNTs composite was characterized by XRD, as shown in FIG. 4(c). The XRD spectra show the peaks (2θ) at about 26.6°, 33.9°, 42.6°, and 51.4°, which can be indexed as (110), (101), (210), and (211) planes, respectively, of the tetragonal phase of $SnO_2$ nanoparticles. The VACNT related peaks at about 26° and 42° further indicated that the test material was the $SnO_2$-VACNTs composite.

The functional groups present on the acid-treated VACNTs and $SnO_2$-VACNTs were examined using FTIR analysis, as shown in FIG. 4(d). Chemical oxidation with $HNO_3$ can generate functional groups at the defect sites of the VACNTs wall. The FTIR spectra of both samples revealed the C=C, C=O, C—N, and N—H stretching vibrations at various wave number positions between 4000 $cm^{-1}$ and 550 $cm^{-1}$. Peaks at about 3790 $cm^{-1}$, 2319 $cm^{-1}$, and 1256 $cm^{-1}$, associated with N—H and C—N band stretching, can be attributed to adsorbed $H_2O$ and $NH_3$. The peaks at 2901 $cm^{-1}$ and 2844 $cm^{-1}$ may be associated with the —CH and C=H band stretching vibrations, respectively. The signals at about 1730 $cm^{-1}$ and 1633 $cm^{-1}$ are related to carbonyl (C=O) stretching vibration of the carboxylic acid group and carbon structure (C=C) of VACNTs, respectively. The peaks at 1445 $cm^{-1}$, 1359 $cm^{-1}$, 1096 $cm^{-1}$, and 804 $cm^{-1}$ correspond to the $CH_2/CH_3$, C—C, C—O, and —OH band stretching, respectively. The signal associated with the Sn—O or Sn—OH stretching vibrations at ~3716 $cm^{-1}$, 645 $cm^{-1}$, and 579 $cm^{-1}$ indicated that the carbon nanomaterial contained $SnO_2$ nanoparticles.

Example 2

Figure 5A:
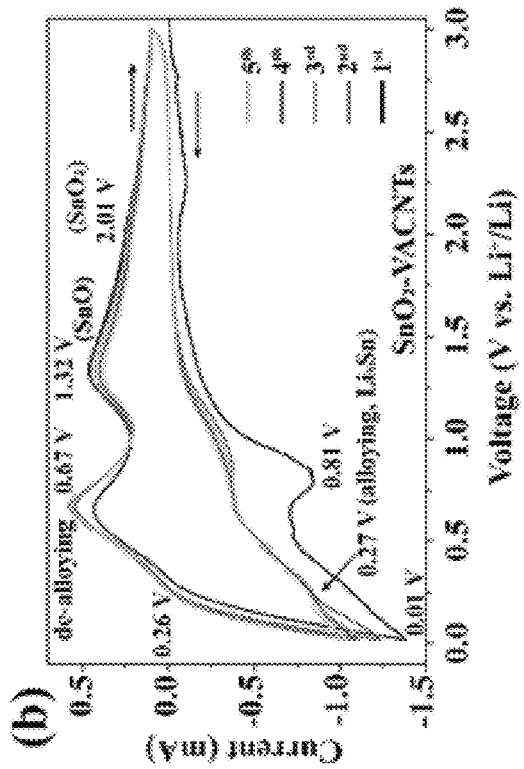
FIG. 5(a) shows a plot of current (in milliamps (mA)) versus voltage (in Volts (V), versus $Li^+/Li$) for pristine VACNTs as an anode material in a Li-ion coin cell, with a scan rate of 0.2 millivolts per second (mV/s) measured between 0.01 V and 3 V.
Figure 5B:
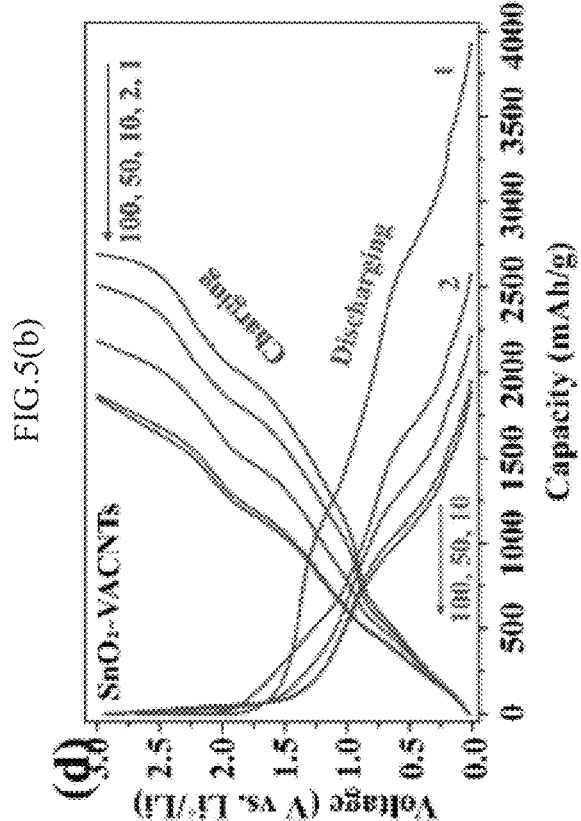
FIG. 5(b) shows a plot of current (in mA) versus voltage (in V, versus $Li^+/Li$) for $SnO_2$-VACNTs as an anode material in a Li-ion coin cell, with a scan rate of 0.2 mV/s measured between 0.01 V and 3 V.

The electrochemical Li-ion storage behavior of pristine VACNTs and $SnO_2$-VACNTs composite anodes for LIBs was examined using lithium foil as a reference electrode. The electrochemical reactions that occurred during the cycling process were studied using cyclic voltammetry (CV) tests. FIGS. 5(a) and 5(b) show CV curves of VACNTs and $SnO_2$-VACNTs composite anodes measured between 0.01 V and 3 V (versus $Li^+/Li$) at a scan rate of 0.2 mV/s for the first five cycles. The electrochemical reactions of pristine and hybrid anode materials in LIBs can be understood as follows. Upon initial charge, the $SnO_2$ transformed to Sn and $Li_2O$ according to the following reaction.

$$SnO_2 + 4Li^+ + 4e^- \rightarrow Sn + 2Li_2O \tag{1}$$

Subsequent lithiation of the $SnO_2$-CNT anode corresponds to the following reversible phase transformation reactions.

$$Sn + xLi^+ + xe^- \leftrightarrow Li_xSn (0 \leq x \leq 4.4) \tag{2}$$

$$C(nanotube) + xLi^+ + xe^- \leftrightarrow Li_xC \tag{3}$$

For both anode materials, sharp irreversible reduction peaks (at about 0.96 V for pristine VACNTs and about 0.81 V for $SnO_2$-VACNTs) during the first CV cycle indicated the formation of solid electrolyte interphase (SEI) on the anode surfaces from the decomposition of EC and DEC. The distinct reduction peak for the composite anode can also be accredited to the initial irreversible reduction of $SnO_2$ to Sn and $Li_2O$ (Equation 1). The reversible reduction peak at about 0.27 V for the composite anode can be associated with the alloying of Li with Sn metal. Besides, reversible oxidation peaks at about 0.39 V for VACNTs can be attributed to the extraction of Li-ions from VACNTs (Equation 3). In contrast, oxidation peaks at about 0.67 V, 1.32 V, and 2.01 V for $SnO_2$-VACNTs can be assigned to de-alloying of $Li_xSn$ (Equation 2) and oxidation of $Sn^{+2}$. The CV cycles overlapped after the first cycle, indicating the promising reversibility of electrochemical reactions, which may be crucial for capacity retention and long cyclability of LIBs.

Figure 5C:
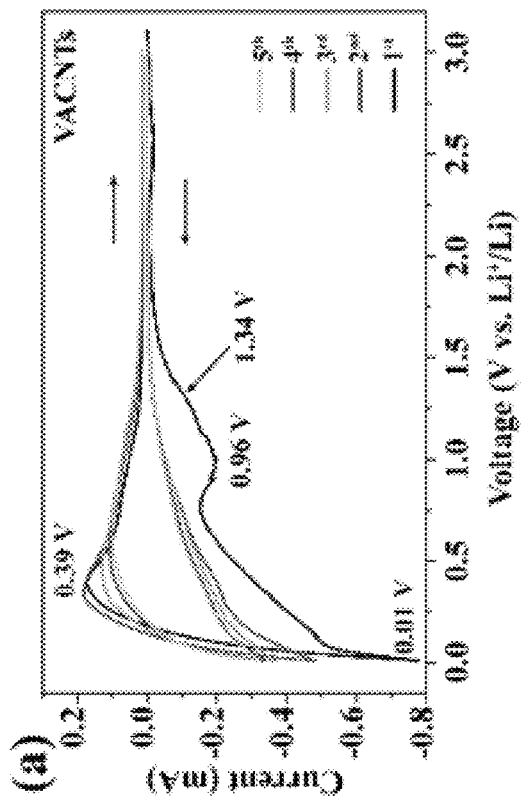
FIG. 5(c) shows a plot of voltage (in V, versus $Li^+/Li$) versus capacity (in mA-hours per gram (mAh/g)), showing the charge/discharge profile for pristine VACNTs as an anode material in a Li-ion coin cell, with a current rate of 0.1 Amps per gram (A/g) within a voltage range of 0.01 V and 3 V.
Figure 5D:
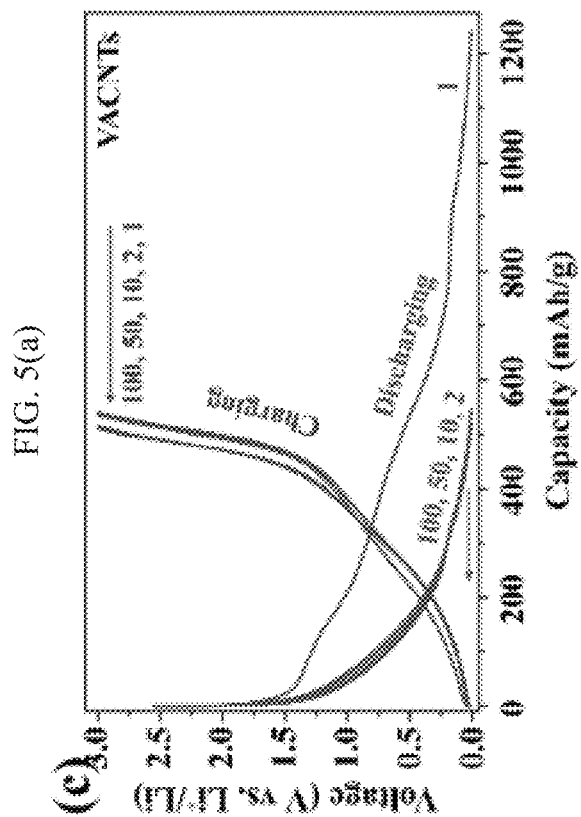
FIG. 5(d) shows a plot of voltage (in V, versus $Li^+/Li$) versus capacity (in mAh/g), showing the charge/discharge profile for $SnO_2$-VACNTs as an anode material in a Li-ion coin cell, with a current rate of 0.1 A/g within a voltage range of 0.01 V and 3 V.

The electrochemical performance of the as-synthesized electrodes was tested by the galvanostatic charge/discharge cycling at a constant current of 0.1 A/g with cut-off potentials at 0.01 V and 3 V versus $Li/Li^+$, as shown in FIGS. 5(c) and 5(d). The first charge and discharge capacities for VACNTs were 535 mAh/g and 1240 mAh/g, respectively. Similarly, the first charge and discharge capacities for $SnO_2$-VACNTs were 2695 mAh/g and 3927 mAh/g, respectively. However, discharge capacities for VACNTs and $SnO_2$-VACNTs in the second cycle were dropped significantly to 542 mAh/g and 2581 mAh/g, respectively. In the first discharge curves of both electrodes, a plateau is present at about 1.4 V, which may be assigned to the irreversible reduction of surface species containing oxygen on VACNTs. Also, the plateau that emerged at about 0.8 V can be attributed to the formation of an SEI layer in pristine VACNTs, while it can be due to the formation of the SEI and $Li_2O$ in the case of the composite electrode. Hence, the largely irreversible capacity loss between the first and second discharge cycles of electrodes was due to the irreversible reactions on the surface of VACNTs, the formation of the solid electrolyte interphase, and the formation of amorphous $Li_2O$ during the first cycle.

Figure 6A:
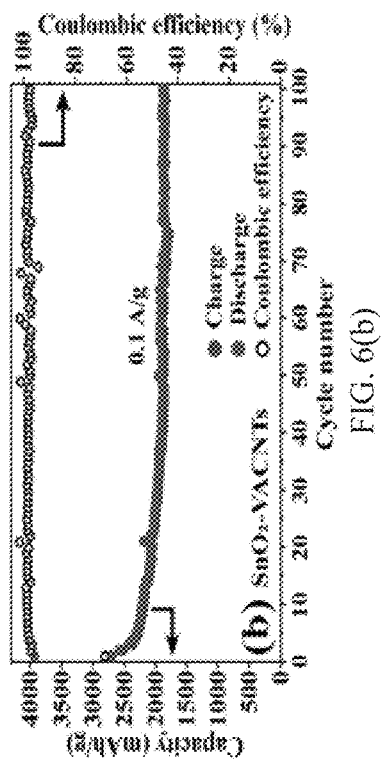
FIG. 6(a) shows a plot of capacity (in mAh/g) versus cycle number, showing cycle stability for pristine VACNTs.
Figure 6B:
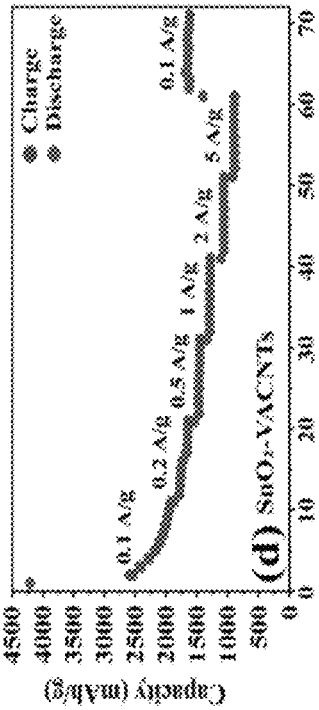
FIG. 6(b) shows a plot of capacity (in mAh/g) versus cycle number, showing cycle stability for $SnO_2$-VACNTs.
Figure 6C:
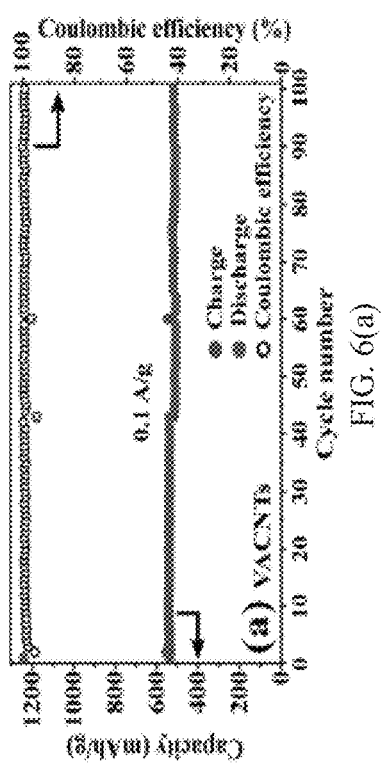
FIG. 6(c) shows a plot of capacity (in mAh/g) versus cycle number, showing rate performance for pristine VACNTs.
Figure 6D:
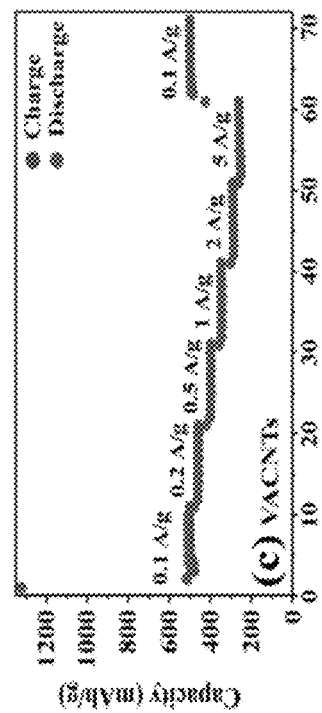
FIG. 6(d) shows a plot of capacity (in mAh/g) versus cycle number, showing rate performance for $SnO_2$-VACNTs.

The galvanostatic cycle performance of the pristine VACNTs and $SnO_2$-VACNTs composite anodes was examined for 100 cycles of charge and discharge, and the results are shown in FIGS. 6(a) and 6(b). The capacity of both anode materials became stable and reversible after the initial few charge/discharge cycles. With a current density at 0.1 A/g, the LIB with VACNTs anode exhibited an excellent cyclability with coulombic efficiencies of more than 99% after the first cycle. The capacity remained about 520 mAh/g at 0.1 A/g after 100 cycles. In comparison, the $SnO_2$-VACNTs anode displayed a considerably high capacity with an initial discharge capacity of 3927 mAh/g. However, the LIB with the composite anode suffered a continuous capacity fading, and after 20 cycles, and it only preserved a discharge capacity of about 2085 mAh/g. Despite the initial capacity fading, it showed promising cyclability after 20 cycles and showed a discharge capacity of about 1891 mAh/g after 100 cycles. The initial poor cyclability of the LIB with the $SnO_2$-VACNTs anode may be attributed to the significant volume change and pulverization of $SnO_2$ nanoparticles, which led to the anode breakdown. Moreover, both anode materials displayed excellent high-power rate capability, as shown in FIGS. 6(c) and 6(d). At current densities of 0.2 A/g, 0.5 A/g, 1 A/g, 2 A/g, and 5 A/g, the reversible capacities of the pristine VACNTs were about 458 mAh/g, 399 mAh/g, 344 mAh/g, 289 mAh/g, and 256 mAh/g, respectively. The anode retained about 95% of its initial capacity at 0.1 A/g, as shown in FIG. 6(c). Similarly, the $SnO_2$-VACNTs composite had reversible capacities of about 1696 mAh/g, 1463 mAh/g, 1294 mAh/g, 1065 mAh/g, and 894 mAh/g at current densities of 0.2 A/g, 0.5 A/g, 1 A/g, 2 A/g, and 5 A/g, respectively (FIG. 6(d)). Also, the composite anode retained more than 83% of its initial discharge capacity at 0.1 A/g.

Figure 6E:
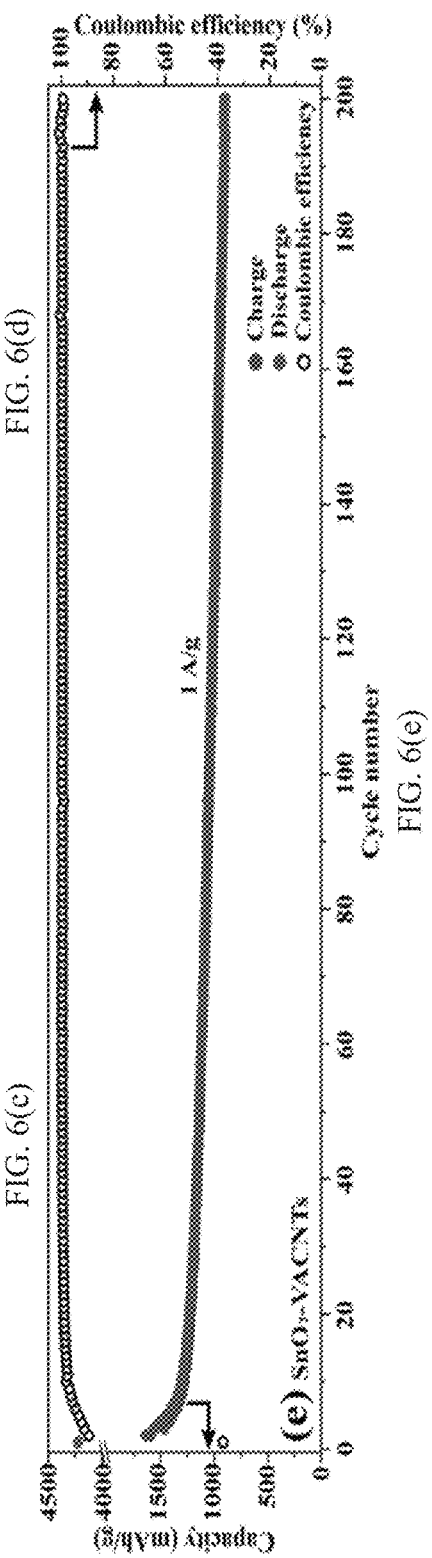
FIG. 6(e) shows a plot of capacity (in mAh/g) versus cycle number, showing cycling performance for $SnO_2$-VACNTs at a high current density of 1 A/g and Coulombic efficiency.

Further, the composite anode's cyclability was evaluated at a high current density of 1 A/g for 200 cycles, as shown in FIG. 6(e). Similar to the performance at the low current density, the composite anode displayed a continuous capacity fading during the first few cycles. However, after the first ten cycles, the composite anode exhibited a highly stable cycling performance with a high specific capacity of more than 900 mAh/g at a high current density of 1 A/g after 200 cycles with an excellent coulombic efficiency, as shown in FIG. 6(e).

Electrochemical impedance spectroscopy (EIS) measurements were performed on the pristine VACNTs and $SnO_2$-VACNTs composite electrodes using a sine wave of 5 mV amplitude over a frequency range of 100 kilohertz (kHz) to 50 megahertz (MHz) to determine the electronic conductivity and Li-ion transportation within electrodes. The Nyquist complex plane impedance measurements were carried out before and after running charge/discharge cycles, as shown in FIGS. 7(a) and 7(b). Both Nyquist plots of the VACNTs and $SnO_2$-VACNTs comprise a semicircle in the high-to-medium frequency region and a straight line inclined at ~45° angle to the real axis at the low-frequency region. The intercept at the Z' axis at high frequency corresponds to the equivalent series resistance ($R_s$), which relates to the total resistance of the electrolyte, separator, and electrical contact. The depressed semicircle in the medium-frequency range describes the charge-transfer impedance ($R_{ct}$) on the electrode/electrolyte interface. Moreover, the straight line at the low-frequency region of the Nyquist plot can be attributed to the Li diffusion process within the electrode.

FIG. 8 shows an equivalent modified Randle's circuit to analyze the impedance spectra. In the equivalent model circuit, $CPE_{ct}$ and $Z_w$ represent the double layer capacitance at intermediate frequencies and the Warburg impedance associated with Li-ion diffusion, respectively.

FIG. 9 shows a table of parameters after fitting the impedance data using equivalent Randle's circuit for the VACNTs and the $SnO_2$-VACNTs electrodes before and after 100 cycles of charge and discharge. Before cycling, the composite electrode exhibited lower series resistance ($R_s$) and charge-transfer resistance ($R_{ct}$) than the VACNTs electrode, indicating fast electron transport and fast faradaic reactions at the electrode surface. The depressed semicircle size in the mid-frequency range for both electrodes increased after 100 cycles, revealing higher charge transfer resistance after the cycling process. The increase of resistance may be caused by the formation and thickening of SEI and loss of active materials. In the $SnO_2$-VACNTs electrode, the charge-transfer resistance along with series resistance after cycling increased significantly than the pristine VACNTs electrode. The increase of series resistance could be attributed to the formation and extension of the gap between the $SnO_2$ particle and CNT wall as a result of substantial volume expansion/contraction and pulverization of the $SnO_2$ during lithiation/delithiation. The continuous pulverization of the $SnO_2$ particle exposes a new grain surface for the fresh SEI formation, which leads to the thickening of the SEI on the anode material, increasing charge-transfer resistance. The increase in electrode resistances of the composite electrode is well supported by the continuous capacity fading during the first few cycles of the $SnO_2$-VACNTs, as shown in FIGS. 6(b) and 6(e).

Overall, the pristine VACNTs anode exhibited very stable cycling stability up to 100 cycles with a capacity of about 520 mAh/g at a current density of 0.1 Ah/g and excellent rate capability at various high current densities. The $SnO_2$-VACNTs composite electrode displayed a much higher capacity of about 1891 mAh/g at a current density of 0.1 Ah/g after 100 cycles and a high-rate capacity of about 894 mAh/g even at a high current density of 5 A/g. The composite electrode also showed long-term cycling stability for 200 cycles at a high current density of 1 A/g with a capacity of more than 900 mAh/g after 200 cycles with excellent coulombic efficiency, showing potential anode material for high-energy and high-power LIBs.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A method of synthesizing vertically aligned carbon nanotubes (VACNTs), the method comprising:
   providing a pristine nickel foam (Ni—F) substrate in a reaction chamber;
   lowering a pressure of the reaction chamber to below 1 Torr and providing a carbon precursor gas to the chamber while direct current (DC) plasma is applied to perform a plasma-enhanced chemical vapor deposition (PECVD) process to synthesize the VACNTs directly on the pristine Ni—F substrate; and
   performing a physical vapor deposition process or a chemical vapor deposition process on the VACNTs connected directly to the Ni—F substrate to coat the VACNTs with nanoparticles such that the VACNTs have a coating of the nanoparticles on respective outer walls thereof.

2. The method according to claim 1, the VACNTs being multi-walled VACNTs, and
   the VACNTs being binder-free.

3. The method according to claim 1, the nanoparticles comprising at least one of tin (Sn), silicon (Si), copper (Cu), germanium (Ge), and nickel cobalt (NiCo).

4. The method according to claim 1, the nanoparticles being tin (Sn) nanoparticles, silicon (Si) nanoparticles, germanium (Ge) nanoparticles, or nickel cobalt (NiCo) nanoparticles.

5. The method according to claim 1, the physical vapor deposition or chemical vapor deposition process comprising providing the nanoparticles during the physical vapor deposition or chemical vapor deposition process.

6. The method according to claim 5, the nanoparticles comprising at least one of tin (Sn), silicon (Si), germanium (Ge), and nickel cobalt (NiCo).

7. A compound comprising:
   a nickel foam (Ni—F) substrate;
   vertically aligned carbon nanotubes (VACNTs) disposed on and directly connected to the Ni—F substrate; and
   a coating of nanoparticles on respective outer walls of the VACNTs,
   the nanoparticles comprising at least one of tin (Sn), silicon (Si), copper (Cu), germanium (Ge), and nickel cobalt (NiCo).

8. The compound according to claim 7, the VACNTs being multi-walled VACNTs, and
   the VACNTs being binder-free.

9. The compound according to claim 7, the nanoparticles being Sn nanoparticles, Si nanoparticles, Ge nanoparticles, or NiCo nanoparticles.

10. The compound according to claim 7, the VACNTs being multi-walled VACNTs,
    the VACNTs being binder-free, and
    the nanoparticles being Sn nanoparticles, Si nanoparticles, Ge nanoparticles, or NiCo nanoparticles.

11. A lithium-ion battery, comprising:
    a cathode comprising lithium;
    an anode comprising the compound according to claim 7; and
    an electrolyte disposed between the cathode and the anode.

12. The lithium-ion battery according to claim 11, the VACNTs being multi-walled VACNTs, and
    the VACNTs being binder-free.

13. The lithium-ion battery according to claim 11, the nanoparticles being Sn nanoparticles, Si nanoparticles, Cu nanoparticles, Ge nanoparticles, or NiCo nanoparticles.

14. A method of synthesizing vertically aligned carbon nanotubes (VACNTs), the method comprising:
    providing a pristine nickel foam (Ni—F) substrate in a reaction chamber;
    lowering a pressure of the reaction chamber to below 1 Torr and providing a carbon precursor gas to the chamber while direct current (DC) plasma is applied to perform a plasma enhanced chemical vapor deposition (PECVD) process to synthesize the VACNTs directly on the pristine Ni—F substrate;
    after performing the PECVD process, performing a physical vapor deposition process or a chemical vapor deposition process on the VACNTs directly connected to the Ni—F substrate to coat the VACNTs with nanoparticles such that the VACNTs have a coating of the nanoparticles on respective outer walls thereof,
    the VACNTs being multi-walled VACNTs,
    the nanoparticles being tin (Sn) nanoparticles, silicon (Si) nanoparticles, copper (Cu) nanoparticles, germanium (Ge) nanoparticles, or nickel cobalt (NiCo) nanoparticles, and
    the VACNTs being binder-free.

15. The method according to claim 14, the physical vapor deposition or chemical vapor deposition process comprising providing the nanoparticles during the physical vapor deposition or chemical vapor deposition process.

16. The method according to claim 14, the performing of the PECVD process to synthesize the VACNTs directly on the pristine Ni—F substrate comprising performing the PECVD process to synthesize the VACNTs in the presence of ammonia gas.

17. The method according to claim 1, the performing of the PECVD process to synthesize the VACNTs directly on the pristine Ni—F substrate comprising performing the PECVD process to synthesize the VACNTs in the presence of ammonia gas.

18. The compound according to claim 7, a diameter of each VACNT disposed on and directly connected to the Ni—F substrate being in a range of from 150 nanometers (nm) to 270 nm.

19. The method according to claim 14, the DC plasma being applied at an operating pressure of the DC plasma of about 7 Torr.

20. The method according to claim 1, the DC plasma being applied at an operating pressure of the DC plasma of about 7 Torr.

* * * * *